United States Patent
Dangy Caye

(10) Patent No.: US 11,281,167 B2
(45) Date of Patent: Mar. 22, 2022

(54) ELECTRONIC DEVICE AND A METHOD OF OPERATING SUCH AN ELECTRONIC DEVICE

(71) Applicant: Huawei Technologies Co., Ltd., Shenzhen (CN)

(72) Inventor: Nicolas Dangy Caye, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 740 days.

(21) Appl. No.: 16/070,435

(22) PCT Filed: Jan. 14, 2016

(86) PCT No.: PCT/EP2016/050646
§ 371 (c)(1),
(2) Date: Jul. 16, 2018

(87) PCT Pub. No.: WO2017/121480
PCT Pub. Date: Jul. 20, 2017

(65) Prior Publication Data
US 2019/0025768 A1    Jan. 24, 2019

(51) Int. Cl.
| | | |
|---|---|---|
| G04G 21/00 | (2010.01) |
| G04G 21/08 | (2010.01) |
| G04C 3/00 | (2006.01) |
| G06F 3/02 | (2006.01) |
| G06F 3/0362 | (2013.01) |
| G06F 3/0487 | (2013.01) |

(52) U.S. Cl.
CPC ............ *G04G 21/00* (2013.01); *G04C 3/007* (2013.01); *G04G 21/08* (2013.01); *G06F 3/0202* (2013.01); *G06F 3/0362* (2013.01); *G06F 3/0487* (2013.01)

(58) Field of Classification Search
CPC .......... G04G 21/00; G04G 21/08; G04C 3/08
See application file for complete search history.

(56) References Cited

U.S. PATENT DOCUMENTS

| | | | |
|---|---|---|---|
| 3,662,537 A | 5/1972 | Fujimori |
| 6,556,222 B1 | 4/2003 | Narayanaswami |
| | (Continued) | |

FOREIGN PATENT DOCUMENTS

| | | | |
|---|---|---|---|
| CN | 104750305 A | 7/2015 |
| CN | 104919379 A | 9/2015 |
| | (Continued) | |

OTHER PUBLICATIONS

Machine Translation and Abstract of Japanese Publication No. JP2013064610, Apr. 11, 2013, 17 pages.

(Continued)

*Primary Examiner* — Edwin A. Leon
*Assistant Examiner* — Jason M Collins
(74) *Attorney, Agent, or Firm* — Conley Rose, P.C.

(57) ABSTRACT

An electronic device includes a processor configured to implement a user interface for allowing a user to interact with the electronic device. The electronic device further includes a bezel and at least two switches. The bezel is rotatably mounted on a housing of the electronic device. A plurality of teeth of the bezel sequentially activate the at least two switches during rotation of the bezel. The rotation of the bezel allows the user to interact with the electronic device on the basis of the user interface.

17 Claims, 36 Drawing Sheets

Bezel with 23 teeth (i.e. one tooth "missing")

(56) References Cited

U.S. PATENT DOCUMENTS

| | | |
|---|---|---|
| 7,506,269 B2 | 3/2009 | Lang |
| 9,158,422 B2 | 10/2015 | Graig et al. |
| 2002/0101457 A1 | 8/2002 | Lang |
| 2003/0070106 A1 | 4/2003 | Kosuda et al. |
| 2004/0021702 A1 | 2/2004 | Lucaci et al. |
| 2005/0001821 A1 | 1/2005 | Low |
| 2013/0099009 A1 | 4/2013 | Filson et al. |
| 2014/0143678 A1 | 5/2014 | Mistry et al. |
| 2014/0143737 A1 | 5/2014 | Mistry et al. |
| 2014/0347289 A1 | 11/2014 | Suh et al. |
| 2015/0186030 A1 | 7/2015 | Yoo et al. |
| 2016/0327916 A1* | 11/2016 | Kim .................. G06F 1/163 |

FOREIGN PATENT DOCUMENTS

| | | |
|---|---|---|
| CN | 105051663 A | 11/2015 |
| CN | 105247450 A | 1/2016 |
| EP | 0216420 B1 | 12/1988 |
| EP | 0436468 B1 | 8/1994 |
| JP | H01251524 A | 10/1989 |
| JP | H02196993 A | 8/1990 |
| JP | 2001060137 A | 3/2001 |
| JP | 2001344039 A | 12/2001 |
| JP | 2004212082 A | 7/2004 |
| JP | 2005017012 A | 1/2005 |
| JP | 2013064610 A | 4/2013 |
| JP | 2014174031 A | 9/2014 |
| JP | 2015228943 A | 12/2015 |
| KR | 101520806 B1 | 5/2015 |
| KR | 20150095540 A | 8/2015 |
| WO | 2005065404 A2 | 7/2005 |
| WO | 2014081184 A1 | 5/2014 |
| WO | 2015034966 A1 | 3/2015 |
| WO | 2016048549 A1 | 3/2016 |

OTHER PUBLICATIONS

Machine Translation and Abstract of Japanese Publication No. JP2015228943, Dec. 21, 2015, 26 pages.
Foreign Communication From a Counterpart Application, Chinese Application No. 201680066083.1, Chinese Office Action dated Apr. 19, 2019, 8 pages.
Machine Translation and Abstract of European Publication No. EP0216420, Dec. 7, 1988, 8 pages.
Machine Translation and Abstract of European Publication No. EP0436468, Aug. 3, 1994, 8 pages.
Machine Translation and Abstract of Japanese Publication No. JP2004212082, Jul. 29, 2004, 12 pages.
Foreign Communication From a Counterpart Application, PCT Application No. PCT/EP2016/050646, English Translation of International Search Report dated Sep. 7, 2016, 5 pages.
Foreign Communication From a Counterpart Application, PCT Application No. PCT/EP2016/050646, English Translation of Written Opinion dated Sep. 7, 2016, 7 pages.

* cited by examiner

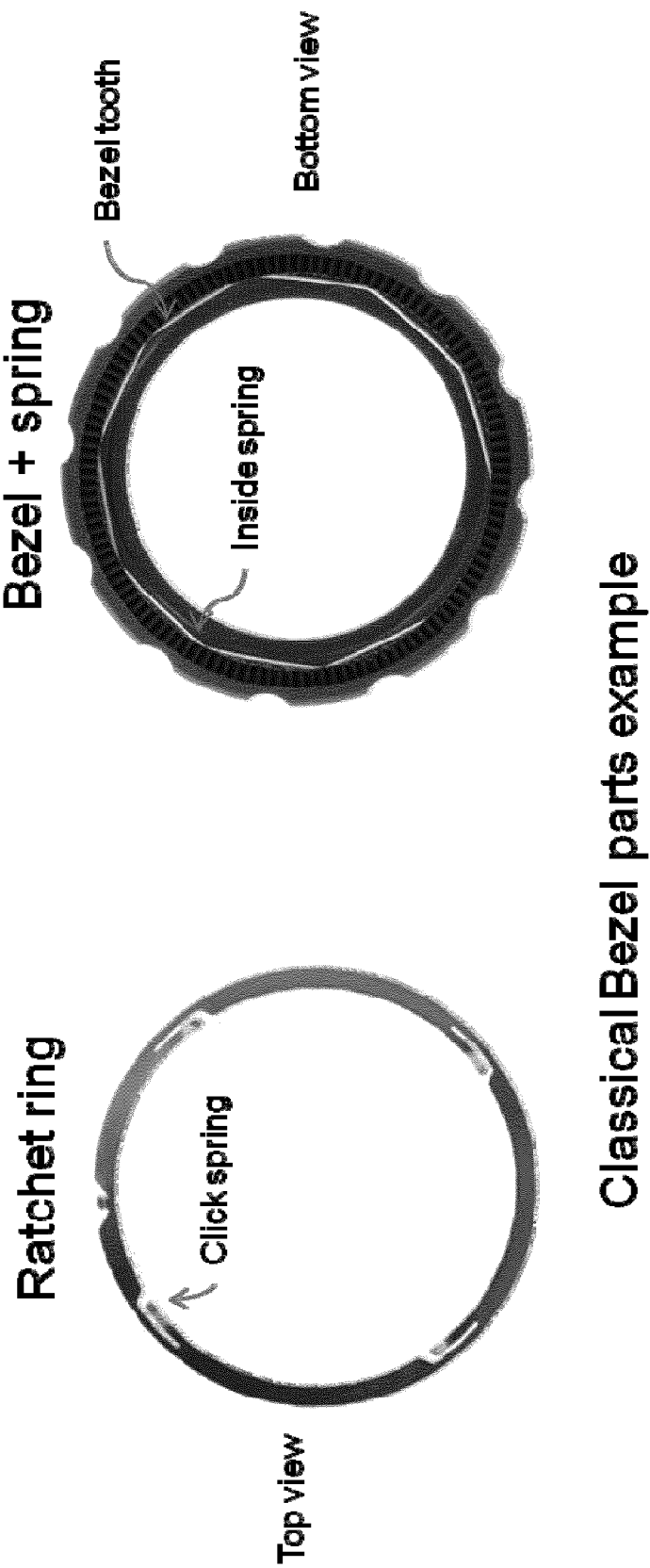

ELECTRONIC DEVICE AND A METHOD OF OPERATING SUCH AN ELECTRONIC DEVICE

CROSS-REFERENCE TO RELATED APPLICATIONS

This application is a U.S. National Stage of International Patent Application No. PCT/EP2016/050646 filed on Jan. 14, 2016, which is hereby incorporated by reference in its entirety.

TECHNICAL FIELD

The present invention relates to an electronic device and a method of operating such an electronic device. In particular, the present invention relates to a smart watch and a method of operating such a smart watch.

BACKGROUND

As technology advancements continue to miniaturize electronic circuits, portable electronic devices are quickly becoming capable of more and more computationally powerful operations. Many complex program applications, once only executed on large desktop computers, can now be found running on modern "wearable" electronic devices. For instance, modern personal digital assistants (PDAs), cellular phones, and smart watches may include a text and e-mail editor, a database program, and an Internet browser.

Compared to a traditional watch, a smart watch brings additional features such as notifying a user of incoming calls, tracking activity, pushing mails or short messages (SMS) in addition of displaying time. It can interact with a distant application and display useful information to the user through a panel such as displaying a weather forecast, the name of the caller with a photo, giving instructions of a navigation application or remote controlling a music application. It can also run local applications related to time (clock, stopwatch, alarm), health (activity tracker, step counter, Heart Rate monitor) that leverage local sensors (accelerometer, gyroscope, heart rate monitor) and actuators (vibrator, display).

One complicating factor in executing complex programs on such small electronic devices (e.g. smart watches) is the lack of physical space available for a practical user interface compatible with complex program applications. Wearable electronic devices often have a small amount of surface area on which to provide a display screen and user input hardware. Because of this spatial constraint, wearable electronic devices tend to miniaturize input hardware, such as push buttons, knobs, and joysticks, so that less surface area is taken up by input elements. Miniaturizing input hardware, however, often reduces their handiness and makes wearable electronic devices awkward and difficult to use.

WO 2014/081184 discloses a wearable computing device having a rotatable element and a detector configured to detect rotation of the rotatable element using an optical sensor in or on a band.

US2013/0099009 discloses an optical sensor mechanism that senses movement of a textured surface printed on an inner surface of an outer ring.

Optical sensor based mechanism of detecting rotation has inherent drawbacks. For example, optical navigation finger module that senses movement of a textured surface printed on an inner surface of an outer ring is comparatively large. Such module requires additional space within an already constrained spaced device, e.g. a smart watch. The printed optical element requires surfaces on the inner side of the outer ring, which brings complexity into implementation. Moreover, optical approach brings challenges for fulfilling watertightness and dustproofness into system design; and requires comparatively large power consumption in a critical battery powered system, e.g. a smart watch.

U.S. Pat. No. 7,506,269 discloses a user interface for small computing devices. The user interface includes a display screen and a bezel encircling the display screen. A rotation sensor is configured to sense the magnitude and direction of the bezel rotation. The rotation sensor is a spring-loaded, single pole, double throw switch. Thus, when the bezel is rotated counterclockwise, the bezel teeth push the sensor lever upwardly to make contact with a first switch throw, and thereby indicating counterclockwise rotation of the bezel. Conversely, when the bezel is rotated clockwise, the bezel teeth push the switch throw downwardly to make contact with a second switch throw, thereby indicating a clockwise rotation of the bezel. A single pole double throw (SPDT) switch can be on in two positions, switching on a separate device in each case. It is often called a changeover switch. For example, a SPDT switch can be used to switch on a red lamp in one position and a green lamp in the other position. From the perspective of implementing a SPDT switch into a small computing device, reliability of the SPDT approach is questionable. In a case that the single pole malfunctions after certain times of bezel's rotation, comparatively expensive cost may be incurred to repair it. Moreover, the mechanical cooperation between the bezel teeth and the switch brings difficulty to support watertightness and dustproofness required in a small computing device. Lastly, comparatively large size of such spring loaded SPDT is a drawback in an already heavy space-constrained small computing device.

Thus, there is a need for an electronic device comprising an improved user interface, more particular a smart watch comprising an improved user interface.

Aforementioned references are all incorporated herein by references.

SUMMARY

It is an object of the invention to provide an electronic device comprising an improved user interface, more particular a smart watch comprising an improved user interface.

The foregoing and other objects are achieved by the subject matter of the independent claims. Further implementation forms are apparent from the dependent claims, the description and the figures.

According to a first aspect, an electronic device is provided. The electronic device includes a processor configured to implement a user interface for allowing a user to interact with the electronic device. The electronic device further includes a display coupled with the processor. The display is configured to allow the user to interact with the electronic device on the basis of the user interface. The electronic device further includes a bezel and at least two switches. The bezel is rotatably mounted on a housing of the electronic device. A plurality of teeth of the bezel sequentially activate the at least two switches during rotation of the bezel. The rotation of the bezel allows the user to interact with the electronic device on the basis of the user interface.

Thus, an electronic device is provided including an improved user interface in the form of a rotatable bezel thanks to at least two switches capable of being sequentially activated by teeth of the rotatable bezel. Sequentially activating the switches by the teeth includes contacting, pushing, pressing, biasing, or otherwise engaging or asserting the switches by the teeth. The proposed solution allows the processor to easily detect an event of the at least two switches being sequentially activated, for example, pressed. Thus the processor is capable of converting a rotation event of the rotatable bezel into design of the user interface. Optionally, direction of the bezel rotation (i.e. clockwise, counterclockwise) can be detected based on order/sequence of the at least two switches being activated or otherwise engaged, for example by pressing.

In a first possible implementation form of the electronic device according to the first aspect, the electronic device further includes a microprocessor coupled to the at least two switches. The microprocessor is configured to detect that the at least two switches are sequentially activated.

The microprocessor may be a separate low power consumption microprocessor. By using a separate microprocessor, a low power consumption mechanism for detecting a rotation of the bezel is introduced. Optionally, the at least two switches are electrically coupled to GPIO pins of the microprocessor. Optionally, interruption oriented routine can be used by the microcontroller to convert rotation of the bezel into control signals directed to the processor to enrich user interface design. A person skilled in the art can readily appreciate that the microprocessor may be embedded into the processor as well. Optionally, in a case that the processor is a multi-core processor, or a combination of a plurality of processors (e.g. application processors), the microprocessor can be embedded into any core or any one of the processors.

In a second possible implementation form of the electronic device according to the first aspect as such or according to the first implementation form thereof, the electronic device further includes at least one bidirectional spring means coupled to the bezel.

The at least one bidirectional spring means (e.g. a bidirectional click spring) provides support for maintaining an idle bezel position, meanwhile helps the bezel freely rotate clockwise and counterclockwise. Optionally, two, four, or more click springs may be provided to improve reliability of the rotatable bezel system. Optionally, the bidirectional click spring may provide "click" sound or sense of clicking to a user when the bezel is rotating. With this "click" feedback, user's interaction with the electronic device is enriched.

In a third possible implementation form of the electronic device according to the first aspect as such or according to any one of the preceding implementation forms thereof, the electronic device further includes another spring means coupled to the bezel allowing the user to push the bezel down.

The spring means (e.g. a click spring) provides support for moving the bezel in the z axis (i.e. the bezel can be pushed down, and return to idle). Optionally, a dedicated switch is provided to detect an event of bezel being pushed down. The spring can thus allow a bezel tooth to push and release the dedicated switch. Thus it is possible to provide a click feature to enrich user experience and user interface design. Alternatively, the at least two switches according to the first aspect of the implementation can be used together to enroll the click in/out detection function. Simultaneous (or almost simultaneous) on and/or off switching of the at least two switches (i.e. two switches are activated together) can generate signalling/interruption being used to indicating a click in or out position/feature of the bezel. In case of dedicated switch(es) used for click feature, the state of the switches being on and/or off can generate signalling/interruption indicating click in/out feature, and/or located click in/out feature (e.g. bezel being pushed down, bezel returning from being pushed down, bezel being pushed down at certain location, and bezel returning from being pushed down at certain location).

In a fourth possible implementation form of the electronic device according to the first aspect as such or according to any one of the preceding implementation forms thereof, each of the at least two switches includes a movable upper part and a lower part.

In such an implementation form of the electronic device according to the first aspect of the invention, it is possible for the movable upper part being pressed down by bezel teeth to make contact with the lower part (i.e. the switch is on), and being return to unasserted or unbiased position to leave or disengage the contact with the lower part (i.e. the switch if off). The on and/or off of a switch can generate signalling/interruption indicating rotation of the bezel. Optionally, almost simultaneous on and/or off of the at least two switches (i.e. the at least two switches are activated together) can generate signalling/interruption being used to indicating a click down position/feature of the bezel. Optionally, each of the dedicated switch(es) used for click down feature and located click down feature includes a movable upper part and a lower part. In case of dedicated switch(es) used for click feature, on and/or off the dedicated switch(es) can generate signalling/interruption indicating click in/out feature, and/or located click in/out feature.

In a fifth possible implementation form of the electronic device according to the fourth implementation form thereof, the movable upper part goes through a hole on a frame of the electronic device to contact the bezel teeth, and the hole is filled with a sealing means (e.g. a sealing washer, a resilient washer).

In such an implementation form of the electronic device according to the first aspect of the invention, it is possible to improve watertightness and dustproofness of the rotating bezel system. The sealing means can protect the electronic device from water and dust intrusion. The sealing means can also work as a means to help the movable upper part stay where it is (e.g. in the hole).

In a sixth possible implementation form of the electronic device according to the first aspect as such or according to any one of the preceding implementation forms thereof, each of the at least two switches is a single pole single throw (SPST) switch.

By implementing SPST switches in embodiments of this invention, simplicity in design, reliability in implementation and minimum requirement of space is fulfilled. The on and/or off of a SPST switch, or put it another way, the change of the state/status of a SPST switch, can be readily be appreciated to introduce interruption signals which can be used to enrich user interface design. Optionally, the dedicated switch aforementioned can also be an SPST switch.

In a seventh possible implementation form of the electronic device according to the first aspect as such or according to any one of the preceding implementation forms thereof, the bezel is rotatably mounted on the housing via a clipping means.

The clipping means can support bezel's rotation meanwhile maintain bezel's coupling to the housing. Optionally, the clipping means is an inside spring, or an annular spring.

In an eighth possible implementation form of the electronic device according to the first aspect as such or according to any one of the preceding implementation forms thereof, the plurality of bezel teeth is equally distanced/spaced.

Equally distanced teeth provide simplicity of implementation. Optionally, one or more bezel teeth can be deliberately omitted (i.e. introducing a ghost tooth, a missing tooth). With other words, a tooth position is deliberately left empty. The ghost tooth/missing tooth can help to bring an absolute location information to enrich user interface design. For example, when the bezel is rotated or pushed down, a switch in a certain position (e.g. 9 o'clock) gives no signal/interruption feedback. It can be inferred that the switch is not activated/pressed/pushed/asserted due to the ghost tooth/missing tooth. Thus that certain position (e.g. 9 o'clock) information is conveyed to the processor.

In a ninth possible implementation form of the electronic device according to the first aspect as such or according to any one of the preceding implementation forms thereof, when the bezel is in an idle position, a first one of the at least two switches is closer to the first one's nearest bezel tooth than a second one of the at least two switches to the second one's nearest bezel tooth.

By this way, an asymmetry is created in order to distinguish which switch is activated/asserted/pressed first. The more teeth the bezel has, the more difficult becomes to ensure this asymmetry property. Optionally, the bezel has 24 or 30 equally spaced/distanced teeth.

In a tenth possible implementation form of the electronic device according to the first aspect as such or according to any one of the preceding implementation forms thereof, the at least two switches comprise at least two sets of cooperating switches.

Each set of cooperating switches can be used to detect an event of bezel rotation when the set of cooperating switches being sequentially pushed/pressed/asserted. Each set of cooperating switches can also be used to detect an event of bezel click down when the set of cooperating switches being almost simultaneously activated (i.e. pushed/pressed/asserted together). By providing extra set of cooperating switches, redundancy is provided. In case of failure of one or a set of switches, extra set can ensure robustness of the rotating bezel mechanism.

In an eleventh possible implementation form of the electronic device according to the first aspect as such or according to any one of the preceding implementation forms thereof, the processor is configured to operate the user interface in a first configuration, when the bezel is rotated, and in a second configuration, when the bezel stays in an idle position.

Such an implementation form allows enhancing the user interface by assigning different functions to the case, when the bezel is rotated, and the case, when the bezel stays in an idle position.

In a twelfth possible implementation form of the electronic device according to the first aspect as such or according to any one of the preceding implementation forms thereof, the electronic device is a wearable device, in particular a smart watch, or a control device.

According to a second aspect of the invention, an electronic device is provided. The electronic device includes a processor configured to implement a user interface for allowing a user to interact with the electronic device. The electronic device further includes a display coupled with the processor. The display is configured to allow the user to interact with the electronic device on the basis of the user interface. The electronic device further includes a bezel and a plurality of switches located in a plurality of positions. The bezel is mounted on a housing of the electronic device. Positions of the switches correspond to a plurality of different positions of the bezel relative to the housing. The bezel is capable of activating any one of the plurality of switches when the bezel is pushed down at a corresponding switch position. The pushing down of the bezel allows the user to interact with the electronic device on the basis of the user interface. Optionally, the bezel is capable of simultaneously or almost simultaneously activating two or more switches (i.e. activating switches all together) when the bezel is pushed down at a corresponding position. Optionally, the bezel is capable of simultaneously or almost simultaneously activating all switches when the bezel is pushed down.

A person skilled in the art will readily appreciate that implementation forms of the first aspect of the invention can well be applied for the second aspect of the invention as long as application thereof is reasonable or plausible.

According to a third aspect of the invention, a method is provided for detecting bezel movement used for the electronic device as aforementioned. The method includes: detecting a first switch being activated; detecting a second switch being activated; and determining a direction of the bezel movement according to the order of the first switch being activated and the second switch being activated.

A variation of the third aspect relates to a method of detecting bezel movement used for the electronic device as aforementioned. The method includes: detecting a first set of switches being activated; detecting a second set of switches being activated; and determining a direction of the bezel movement according to the order of the first set of switches being activated and the second set of switches being activated.

According to a fourth aspect of the invention relates to a method of detecting bezel movement used for the electronic device as aforementioned. The method includes: detecting a first switch being activated; detecting a second switch being activated; and determining a speed of the bezel movement according to elapsed time between the first switch being activated and the second switch being activated.

A variation of the fourth aspect of the invention relates to a method of detecting bezel movement used for the electronic device as aforementioned. The method includes: detecting a first set of switches being activated; detecting a second set of switches being activated; and determining a speed of the bezel movement according to elapsed time between the first set of switches being activated and the second set of switches being activated.

According to a fifth aspect of the invention, a method is provided for detecting bezel movement used for the electronic device as aforementioned. The method includes: detecting a first switch being activated; detecting a second switch being activated; and determining that the bezel is being pushed down in a case that elapsed time between the first switch being activated and the second switch being activated is short enough to justify that the first switch and the second switch are almost simultaneously activated.

A variation of the fifth aspect of the invention relates to a method of detecting bezel movement used for the electronic device as aforementioned. The method includes: detecting a first set of switches being activated; detecting a second set of switches being activated; and determining that the bezel is being pushed down in a case that elapsed time between the first set of switches being activated and the second set of switches being activated is short enough to justify that the first set of switches and the second set of switches are almost simultaneously activated.

The method according to the third, fourth, and fifth aspects of the invention can be performed by the electronic device according to the first and the second aspect of the invention. Further features of the method according to the third, fourth, and fifth aspects of the invention result directly from the functionality of the electronic device according to the first aspect of the invention and its different implementation forms described above.

BRIEF DESCRIPTION OF THE DRAWINGS

Further embodiments of the invention will be described with respect to the following figures, in which:

FIG. 1d shows an example of classical bezel parts;

In the figures identical reference signs are used for identical or at least functionally equivalent features.

DETAILED DESCRIPTION OF EMBODIMENTS

It is contemplated that a rotating bezel based mechanism of the present invention can be employed to control small computing devices executing complex program applications therein, as well as to manipulate and enter data in the applications. Such small computing devices include personal digital assistants (PDAs), wearable electronic devices (e.g. smart watches, smart glasses), mobile telephones, and the like.

In the following detailed description, reference is made to the accompanying drawings, which form a part of the disclosure, and in which are shown, by way of illustration, specific aspects in which the present invention may be practiced. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1A:
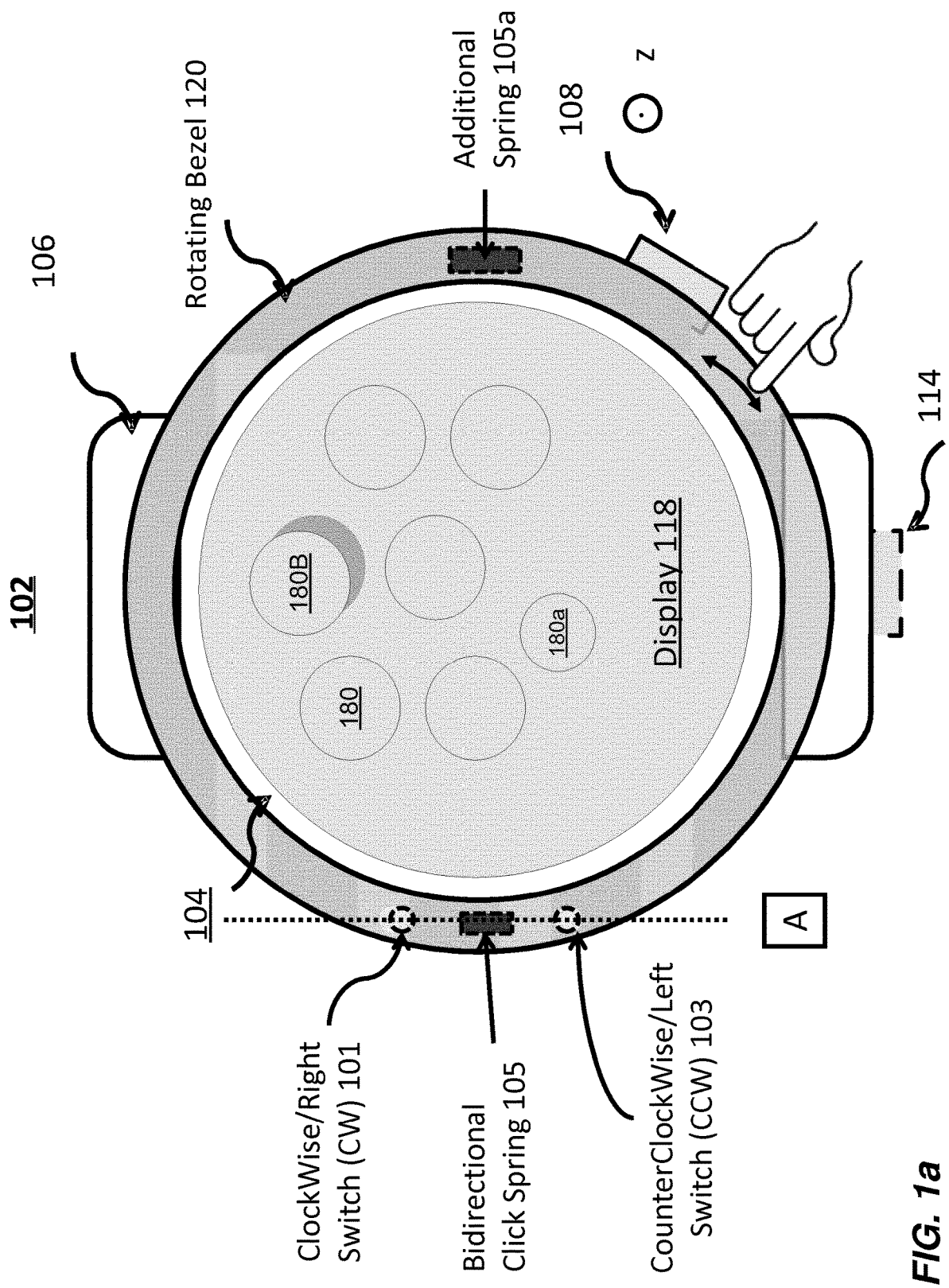
FIG. 1a shows a schematic top view of an electronic device in the form of a smart watch according to an embodiment.
Figure 1B:
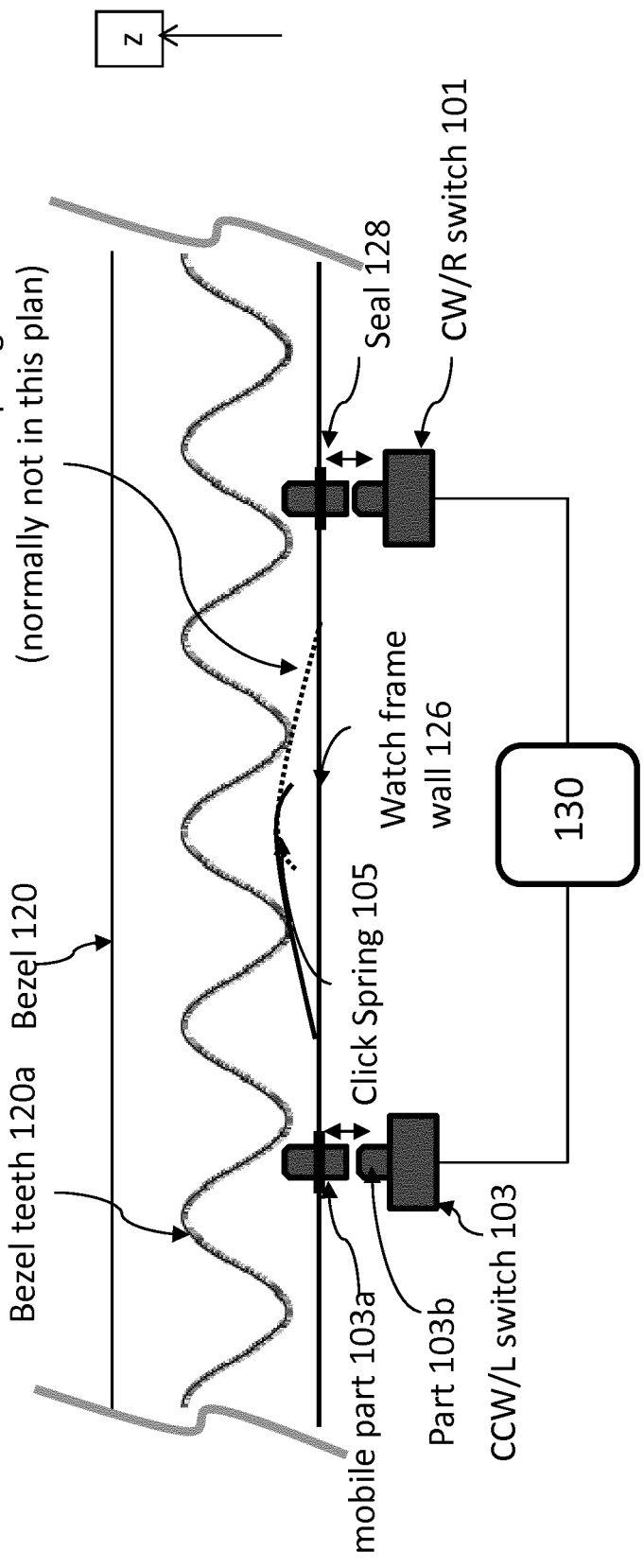
FIG. 1b shows a schematic cross-sectional view of an electronic device in the form of a smart watch according to an embodiment.

FIGS. 1a and 1b show a top view and a cross-sectional view of an electronic device 102. In the figures and the following detailed description the electronic device can be implemented in the form of a smart watch. A person skilled in the art, however, will readily appreciate that the present invention can be advantageously implemented in the form of other electronic devices as well, for instance, in the form of a smart home control device or other types of wearable electronic devices.

Figure 3A:
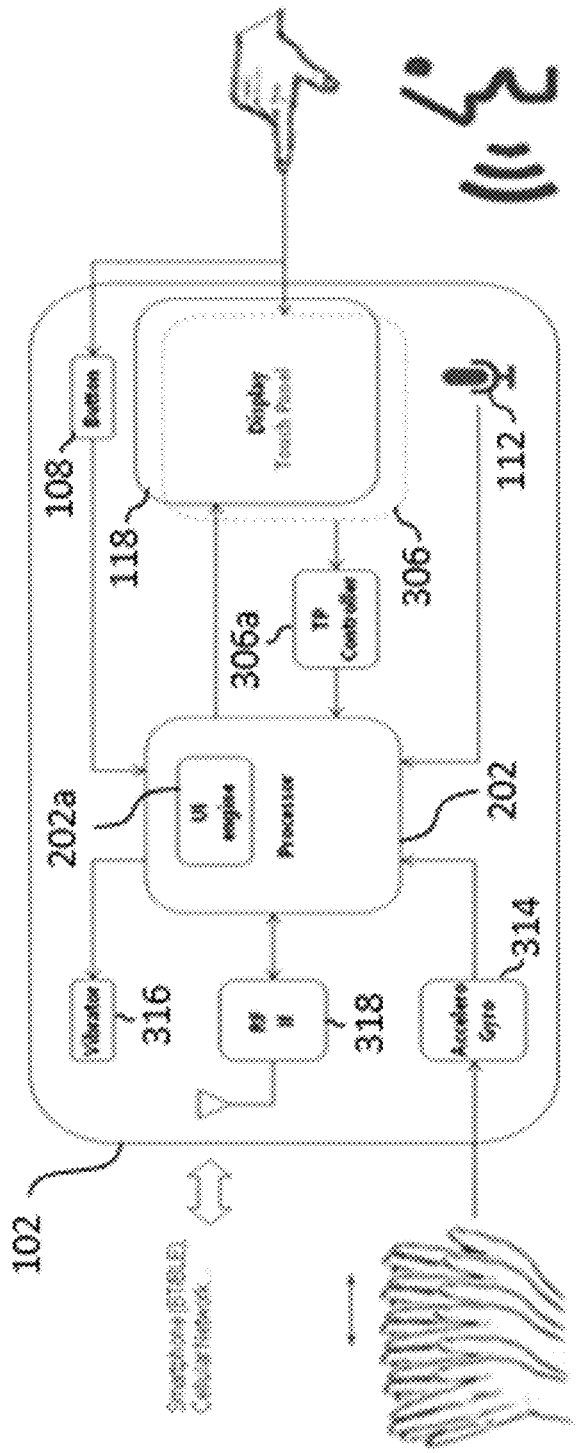
FIG. 3a shows a schematic block diagram of the components of a user interface of the electronic device according to FIG. 1a without showing bezel implementation.
Figure 3B:
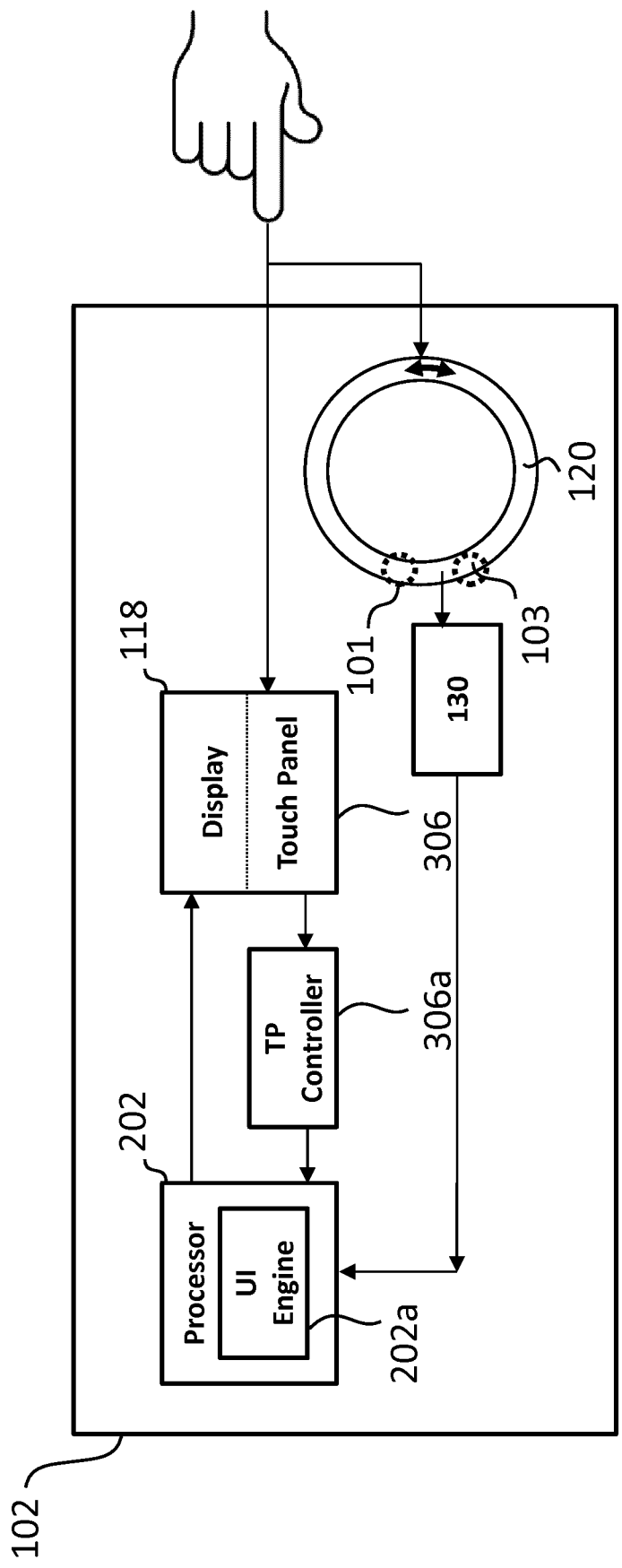
FIG. 3b shows a schematic block diagram of the components of a user interface of the electronic device according to FIG. 1a with rotatable bezel implementation shown.

The electronic device 102 (e.g. smart watch) comprises a processor (e.g. one or more application processors 202 as shown in FIGS. 3a-3b) configured to operate a user interface for allowing a user to interact with the smart watch 102. In an embodiment, the processor can be embedded within a housing or frame of the smart watch.

The smart watch 102 includes a device housing 104 containing the various components of the device. The device housing 104 is preferably made from a durable material, such as a metallic alloy or a hard plastic, which is capable of withstanding the rougher treatment associated with portable devices. A strap/band 106 is coupled with the housing 104 to hold the smart watch 102 close to a user. The strap 106 may be made from metal, plastic, leather, or other suitable material.

The smart watch 102 may include one or more input buttons 108 mounted on the device housing 104. The input buttons 108 can provide activation signals to the smart watch 102 which are responsive to user interaction. For example, an input button 108 may be used to power on and off the smart watch 102, turn on and off a device backlight (not shown), change modes of operation, or start and stop a timer. Thus, the input buttons 108 enable a user to control the smart watch 102 by selecting different tasks during different operating stages of the device. Various types of input elements may be employed by the present invention, including, but not limited to, pull/push button switches, rocker switches, and touch sensitive elements.

The smart watch 102 may also include a speaker (not shown) and a microphone (not shown). The speaker can be used to play recorded music, provide auditory alarms, and produce other sound output (e.g. hands-free talk during a phone call). The microphone can be used to detect sound for recording, pick-up voice commands, and carry out telephone communications.

Additional hardware may be coupled to the smart watch 102 through a connector 114. Such peripheral hardware may include digital cameras, mass storage devices, network adapters, printers, and scanners. Data transfer between the smart watch 102 and peripheral hardware may be conducted through serial or parallel data transfer protocols. Charging the smart watch may also work with the help of the connector 114 (e.g. a USB port or a wireless charging port), e.g. the smart watch 102 may be charged via a USB port or a wireless charging port.

In addition, a communication port (not shown) may be used to carry out wireless communications with other electrical devices. Various communication protocols may be supported by the communication port, including but not limited to Hyper Text Transfer Protocol (HTTP), Post Office Protocol (POP), Time Division Multiple Access (TDMA), Code Division Multiple Access (CDMA), Wireless Application Protocol (WAP), 3GPP communications technologies (e.g. GSM, WCDMA, LTE, LTE-A, 5G), WiFi (the name of a popular wireless networking technology that uses radio waves to provide wireless high-speed Internet and network connections; Wi-Fi™ is a trademarked phrase that means IEEE 802.11x) and Bluetooth (a wireless technology standard for exchanging data over short distances, which is managed by Bluetooth Special Interest Group). BLUETOOTH™ is a Trademark owned by Telefonaktiebolaget LM Ericsson. It should be noted that the protocols listed above are provided as examples only; it is contemplated that many other protocols known by those skilled in the art may be supported by the smart watch 102. In one embodiment of the present invention, the smart watch 102 is part of a wireless piconet, such as a BLUETOOTH™ WAP.

A display screen 118 on the smart watch 102 is used to display information to the user. The display screen 118 is preferably a low power, high-resolution display, such as a liquid crystal display (LCD), and may be a monochrome, gray scale, or color display. Furthermore, the display screen 118 may be touch-sensitive, thereby providing activation signals to the smart watch 102 when the display screen 118 is contacted by the user. A human finger, a stylus (not shown) or other pointing device can be used in conjunction with a touch-sensitive display screen 118 to activate a small region of the display. A person skilled in the art will readily appreciate that the display screen 118 can be round, square, rectangular, or any other shape.

Alternatively, the smart watch 102 may comprises a display 118 and a touch panel in communication with the processor. The display 118 and the touch panel are implemented to provide a touch-sensitive display configured to allow a user to interact with the smart watch 102 by touching the touch panel. In an embodiment, an operating system can be implemented on the processor of the smart watch 102 and can provide a graphical user interface on the display 118. In an embodiment, the touch panel can be a capacitive touch panel. In an embodiment, the touch panel can be a resistive touch panel.

In accordance with an embodiment of the present invention, a bezel 120 encircling the display screen 118 provides a user interface for the smart watch 102. As described in detail below, the bezel 120 is movable relative to the display screen 118 in one or more axes. For example, the bezel 120 can be rotated clockwise, counterclockwise, and slid vertically with respect to FIG. 1. Bezel movement, in turn, is converted to user input for controlling the smart watch 102 and entering data.

Figure 10A:
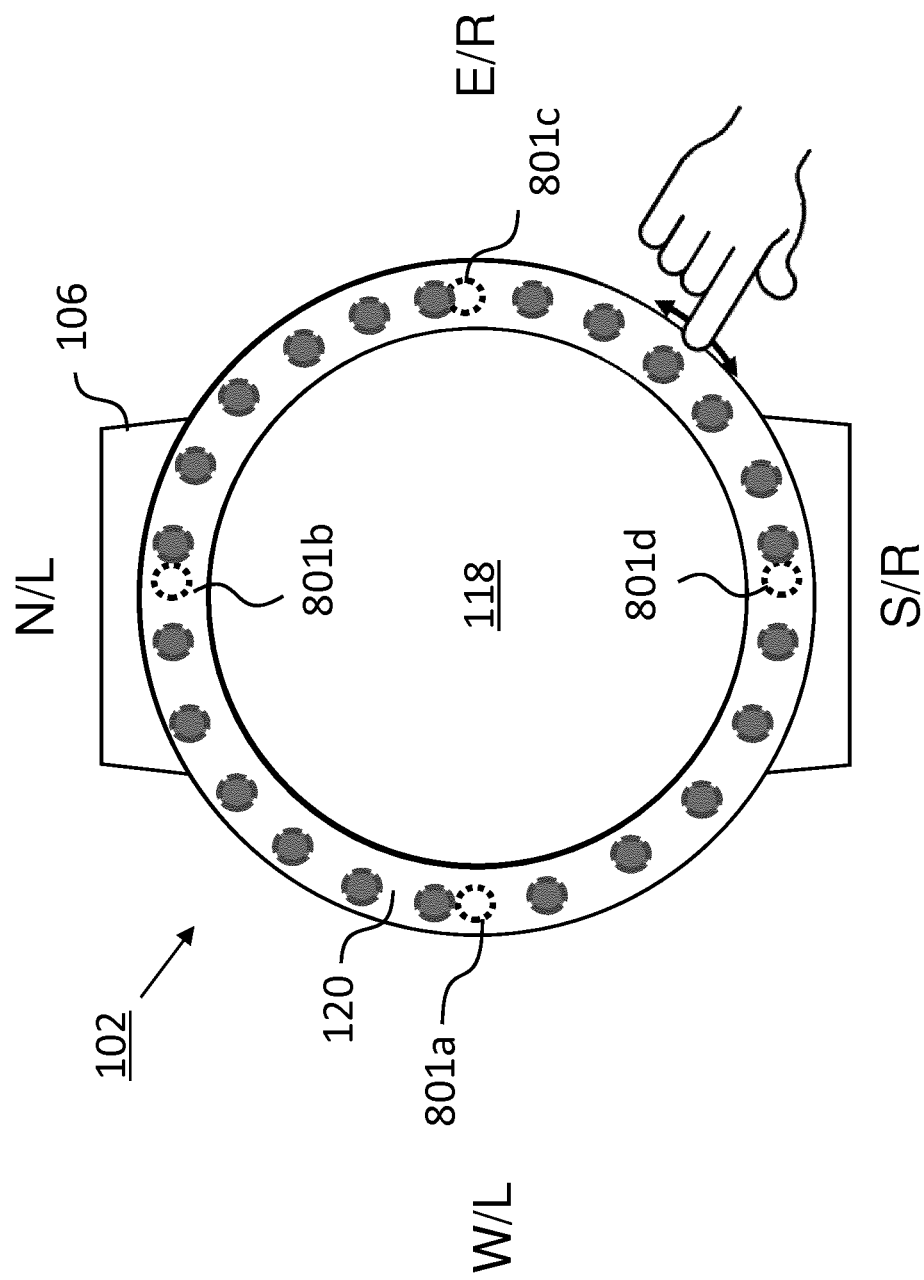
FIGS. 10a-10b illustrate embodiments of a located rotating feature employing the present invention.
Figure 10B:
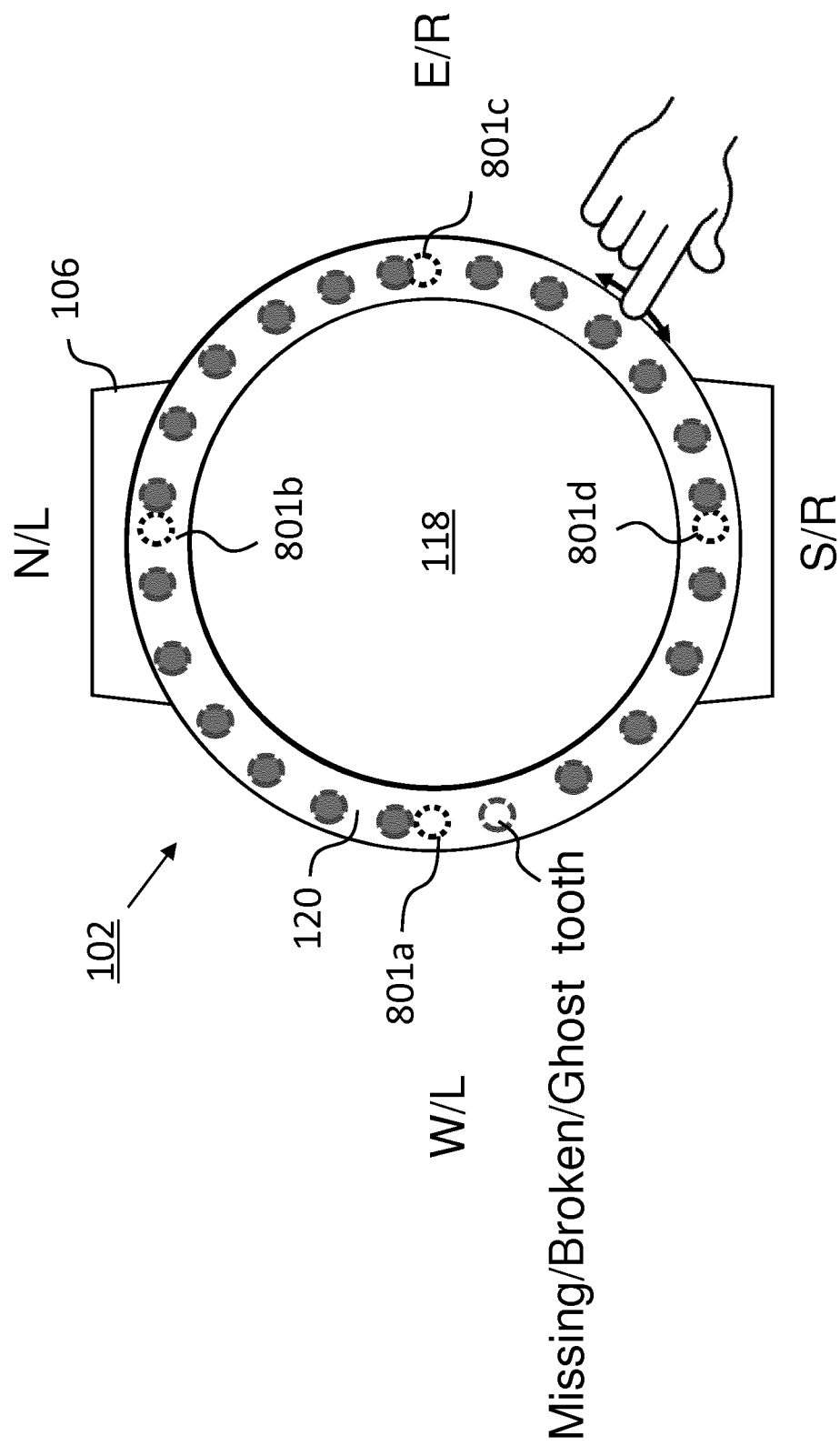

In an embodiment, the bezel 120 is rotatably mounted on the housing or frame of the smart watch 102. As shown in FIG. 1a, the bezel 120 can have an annular or ring-like shape and can be rotatable in a circumferential direction. In an embodiment, the bezel 120 can be rotatably mounted to the housing by being clipped to the housing of the smart watch 102 (e.g. via an inside spring, or an annular ring). In an embodiment, the bezel 120 can be a classical bezel. Refer to FIG. 1d for an example of classical bezel parts. More detail for classical rotating bezel can be referred to patent files, e.g. EP0436468 B1, EP0216101 B1, all of which are incorporated herein by references. The bezel has a plurality of bezel teeth 120a (e.g. 30 teeth), preferably equally distanced/spaced. Alternatively, one or more bezel teeth can be deliberately omitted to enrich user interface design. For example, one or more bezel teeth positions can be left empty (i.e. without a bezel tooth) to support a located rotating feature as shown in FIGS. 10a-10b.

The smart watch 102 further comprises at least one bidirectional click spring 105 coupled to the rotating bezel 120. The bidirectional spring 105 (e.g. click spring shown in FIG. 1d) allows clockwise and counterclockwise rotation of the bezel 120. The click spring 105 also maintains idle/detent bezel position. To assure reliability of the idle position of the rotating bezel 120, at least one bidirectional click spring is provided. Preferably, two, four, or more click springs (e.g. additional spring 105a shown in FIG. 1a) may be implemented.

The smart watch 102 further comprises at least two switches/button switches to sense motion of the rotating bezel: ClockWise/Right Switch (CW) 101, and CounterClockWise/Left Switch (CCW) 103. These switches cooperate with bezel teeth 120a to sense rotation of the rotating bezel 120. They can be sequentially activated, such as pressed/pushed/asserted or otherwise engaged and released/unasserted during a bezel motion step while the click spring 105 helps to retain the bezel 120 in its idle position. For example: right switch 101 followed by left switch 103 in sequence may mean a clockwise bezel motion (i.e. to the right); left switch 103 followed by right switch 101 in sequence may mean a counterclockwise bezel motion (i.e. to the left). Location or number of switches is not limited. In FIG. 1a, two switches are by way of example approximately at positions of 10 o'clock and 8 o'clock, respectively. A plurality of different locations, where switches may be placed, define or correspond to a plurality of different positions of the bezel 120 relative to the housing 104 of the smart watch. As a person skilled in the art will readily appreciate, up to implementation, as a matter of robustness and reliability consideration, following variations or the like may be implemented: two switches, located at 1, 11 o'clock, respectively; two switches, located at 2, 4 o'clock, respectively; two switches, located at 5, 6 o'clock, respectively; four switches, located at 12, 3, 6, 9 o'clock, respectively. In a case of more than two switches, complexity of system design is increased, meanwhile robustness and reliability is improved considering that failure of one or more switches might not deteriorate rotating bezel function.

In the field of switch, following definitions are normally appreciated:
Pole: number of switch contact sets.
Throw: number of conducting positions, single or double.
Way: number of conducting positions, three or more.
Momentary (non latching): switch returns to its normal position when released.
Open: off position, contacts not conducting.
Closed: on position, contacts conducting, there may be several on positions.

Preferably, switches used in embodiments of this invention (e.g. CW 101, CCW 103) are single pole single throw (SPST) switches. A SPST switch is a simple on-off switch. There is one circuit through the switch and one on position. It is normally used to interrupt current for a single pole of a circuit. By implementing SPST switches in embodiments of this invention, simplicity in design, reliability in implementation, and minimum requirement of space is fulfilled. The on and/or off state (on/off state) of a SPST switch, or put it another way, the change of the state/status of a SPST switch, can be readily appreciated to introduce interruption signals which can be used to enrich user interface design.

As shown in FIG. 1b, each switch includes an upper part 103a, and a lower part 103b. The upper part 103a is mobile/movable, thus can be activated, such as, pressed/pushed down by bezel teeth 120a in order to contact the lower part 103b. The lower part 103b is electrically coupled to a microcontroller 130 (e.g. a low power consumption microprocessor, which may be embedded into CPU/AP of the smart watch 102).

Preferably, the lower part 103b is connected to a dedicated GPIO of the microcontroller 130. General-purpose input/output (GPIO) is a generic pin on an integrated circuit whose behavior, including whether it is an input or output pin, can be controlled by a user at run time. GPIO pins may have no special purpose defined, and go unused by default. Assertion on the GPIO can trigger an associated callback interruption routine. For example, in a case that the upper part 103a is pressed down by bezel teeth 120a, a signal (e.g. an interruption signal) is sent to the microcontroller 130. In a case that two switches are sequentially pressed down during rotation of the bezel 120, sequence of switches being pressed down is detectable by the microcontroller 130. A person skilled in the art would readily appreciate that in a case that the upper part 103a is released after bezel teeth 120a moves away, a signal (e.g. an interruption signal) may also be sent to the microcontroller 130. Alternatively, a person skilled in the art would readily appreciate that in a case that the upper part 103a is pressed down by bezel teeth 120a and then released after bezel teeth 120a moves away, a signal (e.g. an interruption signal) may be sent to the microcontroller 130. To summarize, a person skilled in the art will readily appreciate that following events are detectable: on and/or off event for one switch, a combination of on and/or off events for two switches (e.g. on for a first switch and another on for a second switch, on-off for a first switch and another on-off for a second switch), a combination of on and/or off events for more than two switches.

Interruption oriented routine may be used by the microcontroller 130 to convert rotation of the bezel 120 into control signal (e.g. interruption signal) to enrich user interface of the smart watch 102. Interruption oriented routine has the advantage to possibly halt the microprocessor 130 during idle phase and then save power. The impact on power consumption is huge with a microprocessor in sleep mode (e.g. <1 μA) while the needed power to detect the sequence remains very low (only few & simple instructions may be needed) and could be considered as negligible (e.g 1 mA during 50 μs). The total required power for processing and waiting for a step event is then very low. Moreover, latency is not impacted as the microprocessor wake up time is short enough (e.g <10 μs) to be transparent to a user.

The smart watch 102 may further comprises seals 128 (i.e. sealing means) coupled to each of the switches 101/103. The seals 128 are located in holes of watch frame wall 126, through which the switches' mobile parts 103a can contact the lower parts 103b. Watertightness and dustproofness can easily be assured thanks to these seals on the switches. This allows the smart watch system to avoid dust and water intrusion into the smart watch.

Particularly, the bezel 120 can be used to direct a cursor within the display screen 118. Examples of such cursors, e.g. a pointing cursor, a highlighted selection cursor, a scroll bar cursor, a text selection cursor, may be referred to U.S. Pat. No. 7,506,269, which is hereby incorporated by reference in its entirety.

The bezel 120 may also be used to control zoom in/out actions within an application, e.g. in a picture viewer. For example, the bezel 120 may be rotated clockwise/counterclockwise to zoom in/out a picture on the display screen 118.

The bezel 120 may also be used to shift selection among a plurality of applications 180. For example, the bezel 120 may be rotated clockwise/counterclockwise to shift selection from application 180a to application 180b on the display screen 118.

It is contemplated that combinations of bezel movements, or gestures, may be used to interact with the smart watch 102. For example, nudging the bezel 120 down (e.g. the click feature illustrated in FIGS. 7a-d) and then rotating the bezel 120 may cause the screen 118 to scroll vertically. In a similar manner bezel gestures may be used to enter alphanumeric input.

It is contemplated that combinations of bezel movement and gesture detected on the touch-sensitive display screen 118 may be used to interact with the smart watch 102.

The present invention provides a user with a relatively large bezel surface for interfacing with a small computing device. Therefore, the bezel interface is generally easier to handle and manipulate than conventional interfaces for small computing devices. In addition, the bezel is advantageously positioned along the perimeter of the device such that a majority of the device face is left available for displaying information in a display screen. Thus, the bezel interface of the present invention supplies a relatively large user input surface while sacrificing only a minimum amount of display screen space.

In one embodiment of the present invention, the bezel 120 includes ridges (not shown) to help the user grip the bezel 120. Other types of surface treatments, such as protrusions and depressions on the bezel surface, are also contemplated. The bezel 120 may also include a rubber surface to further prevent finger slippage. A person skilled in the art would appreciate that other high friction materials placed on the bezel 120 are considered within the scope of the present invention.

In another embodiment of the present invention, the user may slide a finger along the bezel 120 to rotate the bezel 120 in accordance with PCT/EP2015/072757 filed on Oct. 1, 2015, which is originated from the same inventor of this disclosure, and is hereby incorporated by reference in its entirety.

Figure 1C:
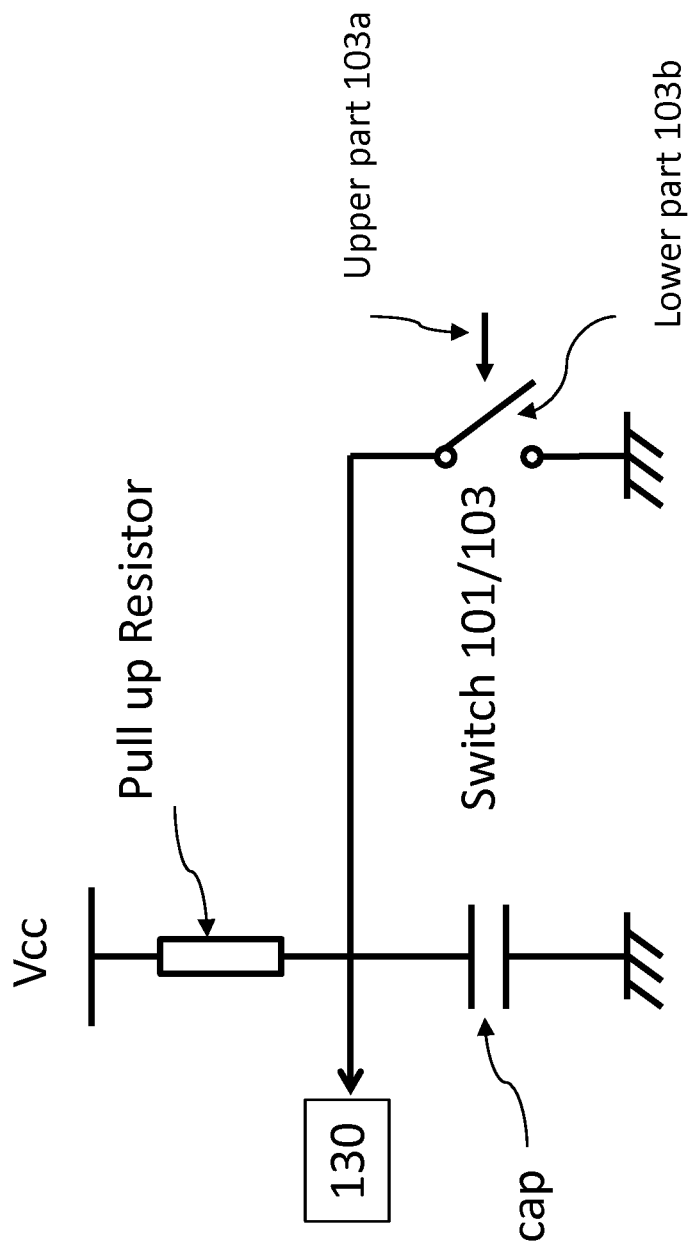
FIG. 1c illustrates a working mechanism of a switch referred in this disclosure.

FIG. 1c illustrates a working mechanism of a switch referred in this disclosure. The switch (e.g. switch 101/103) is normally open. In this case a GPIO port of a microprocessor (i.e. 130) configured as an input sees a high level thanks to the pull up resistor. When bezel 120 rotates, a tooth cooperates with the switch. Specifically, the tooth pushes an upper part of the switch (i.e. mechanical part 103a) that consequently contacts a lower part of the switch (i.e. electronic part 103b) to close the switch. The switch (e.g. switch 101/103) is closed and shortens the GPIO port to the ground. The GPIO port sees now a low level input. As the bezel continues its rotation, the tooth releases the upper part; consequently, the lower part returns to the open state and the GPIO port also returns to a high level input. This high/low/high level sequence or any part of it (high to low or low to high) can be used to trigger an interruption/indication signal. A dedicated interrupt routine is attached to the GPIO port which can be used in motion detection algorithm (described below). An additional capacitor may be added to help to stabilize the signal and filter unwanted glitch effect. A person skilled in the art will readily appreciated that FIG. 1c is only used to exemplify the working mechanism of a switch referred in this disclosure, other variations are possible, e.g. GPIO port sees a low level input when switch is open, and a high level input when switch is closed.

Figure 2:
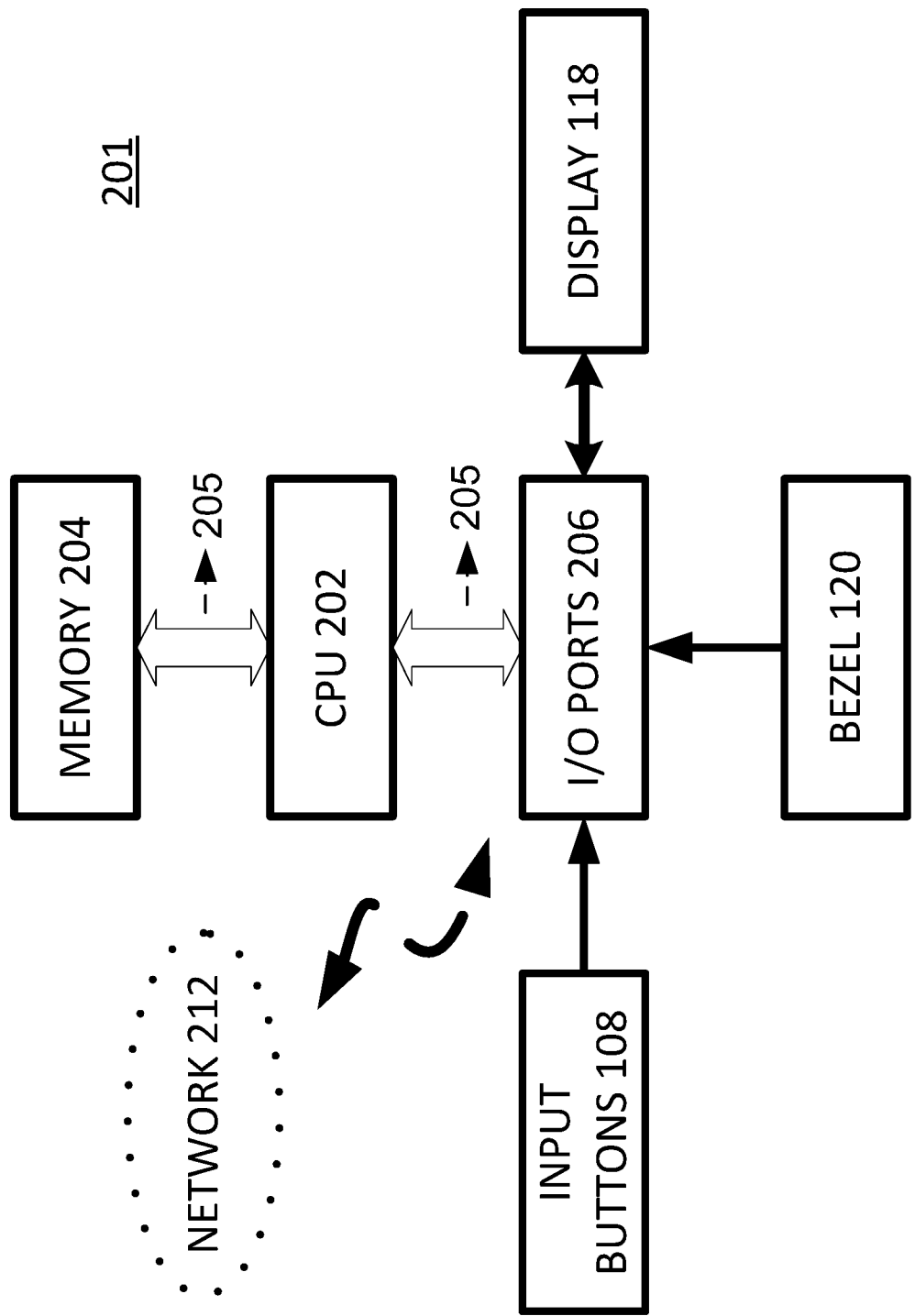
FIG. 2 illustrates major electrical components of an exemplary electronic device employing the present invention.

FIG. 2 illustrates major electrical components of a small electronic device 201 (e.g. the electronic device 102 illustrated in FIGS. 1a-1b) employing the present invention. The small electronic device 201 includes one or more central processing units (CPUs) 202 (e.g. one or more application processors) which are primarily responsible for carrying out arithmetic, logic, and control operations. The CPU 202 may include a floating-point unit (FPU) and/or a co-processor (not shown). Additionally, the CPU 202 may be a general-purpose processor, a digital signal processor (DSP), or other state machine circuit.

A memory unit 204 for storage of data and program code is coupled with the CPU 202 through a system bus 205. The memory unit 204 may include a memory cache, random access memory (RAM), video RAM (VRAM), and read only memory (ROM). In addition, the memory unit 204 may encompass mass storage media, such as magnetic and optical memory media.

The CPU 202 also communicates with input/output (I/O) ports 206 through the system bus 205. The I/O ports 206 allow the CPU 202 to receive and transmit data from and to the outside environment. Thus, various input and output components of the electronic device 201, such as the display screen 118, the input buttons 108, and the bezel 120 are coupled to the I/O ports 206 for transmitting and receiving data to and from a user, respectively. The CPU 202 may access the I/O ports 206 as either memory mapped I/O space or as separately mapped I/O space. In addition, the I/O ports 206 may be configured to support interrupt-driven CPU access.

According to an embodiment of the present invention, the I/O ports 206 are also coupled to a network 212, such as the Internet/wireless communications network. Preferably, communications over the network 212 is achieved over a wireless connection between the electronic device 201 and a network server (not shown). For example, the electronic device 201 may use a transfer control protocol/Internet protocol (TCP/IP) to exchange data across the network 212.

FIGS. 3a-3b shows a schematic block diagram of the components of a user interface of the electronic device 102 (e.g. a smart watch) according to FIG. 1a. Specifically, FIG. 3a shows a schematic block diagram of the electronic device 102 without showing bezel implementation. FIG. 3b shows a schematic block diagram of the electronic device 102 with rotatable bezel implementation shown.

The electronic device 102 (e.g. a smart watch) includes a display 118, a touch panel 306, a touch panel controller 306a and a processor 202. The display 118, the touch panel 306, and the touch panel controller 306a may be integrated into one display. The processor 202 includes a user interface engine 202a. A user can interact with the smart watch 102 shown in FIG. 1a, for instance, by touching the touch panel 306, by pressing a button 108, by means of a microphone 112, by means of an acceleration sensor, and/or gyroscope 314. The smart watch 102 may further comprise a vibrator 316 and a RF interface 318.

FIG. 3b shows schematically how a user can interact with a smart watch 102 according to an embodiment, namely by rotating, pressing and/or touching the bezel 120, and/or by touching the touch panel 306.

Figure 4:
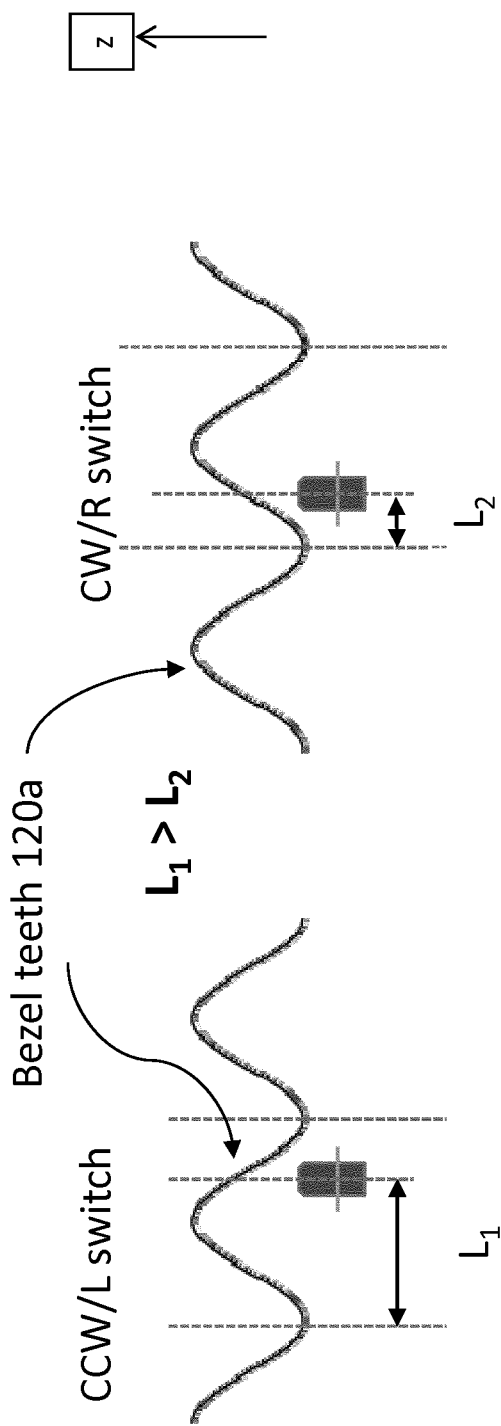
FIG. 4 shows an example of relative position of two switches employing the present invention.

FIG. 4 shows an example of positions of two switches relative to bezel teeth when the rotating bezel system is in an idle position. The relative position assures a correct sequence when the bezel 120 is step rotating (clockwise or counterclockwise). L1 and L2 may be defined according to position of each switch relative to the nearest tooth on its left (seen from the center) and supposing that the bezel teeth are equally spaced. If L1>L2, then "Left/CounterClockWise" switch is the one associated with L1; if L1<L2, then Right/Clockwise switch is the one associated with L1. The following three parameters, i.e. distance between two bezel teeth X, L1, and L2, need to be carefully designed to ensure proper working of the rotating bezel system discussed in various embodiments of this disclosure. If L1=L2, bezel rotating based system may not work because switches are asserted at the same moment when bezel is rotating. It is preferable to create an asymmetry in order to distinguish which switch is asserted/pressed first, i.e. L1!=L2. As soon as L1 differs from L2, the system works, i.e. two switches are sequentially pressed when bezel rotates. As a matter of implementation, L1 and L2 are chosen to support mechanical tolerance. The smaller the X (i.e. the more the number of bezel teeth), the more difficult is to differentiate L1 from L2. In preferred implementations, 24 or 30 teeth are chosen.

FIGS. 5a-5e shows an embodiment of a bezel rotation (e.g. one step clockwise). These figures are used to illustrate (but not limiting) the property of at least two switches are sequentially pushed/pressed/asserted during a bezel rotation.

Figure 5A:
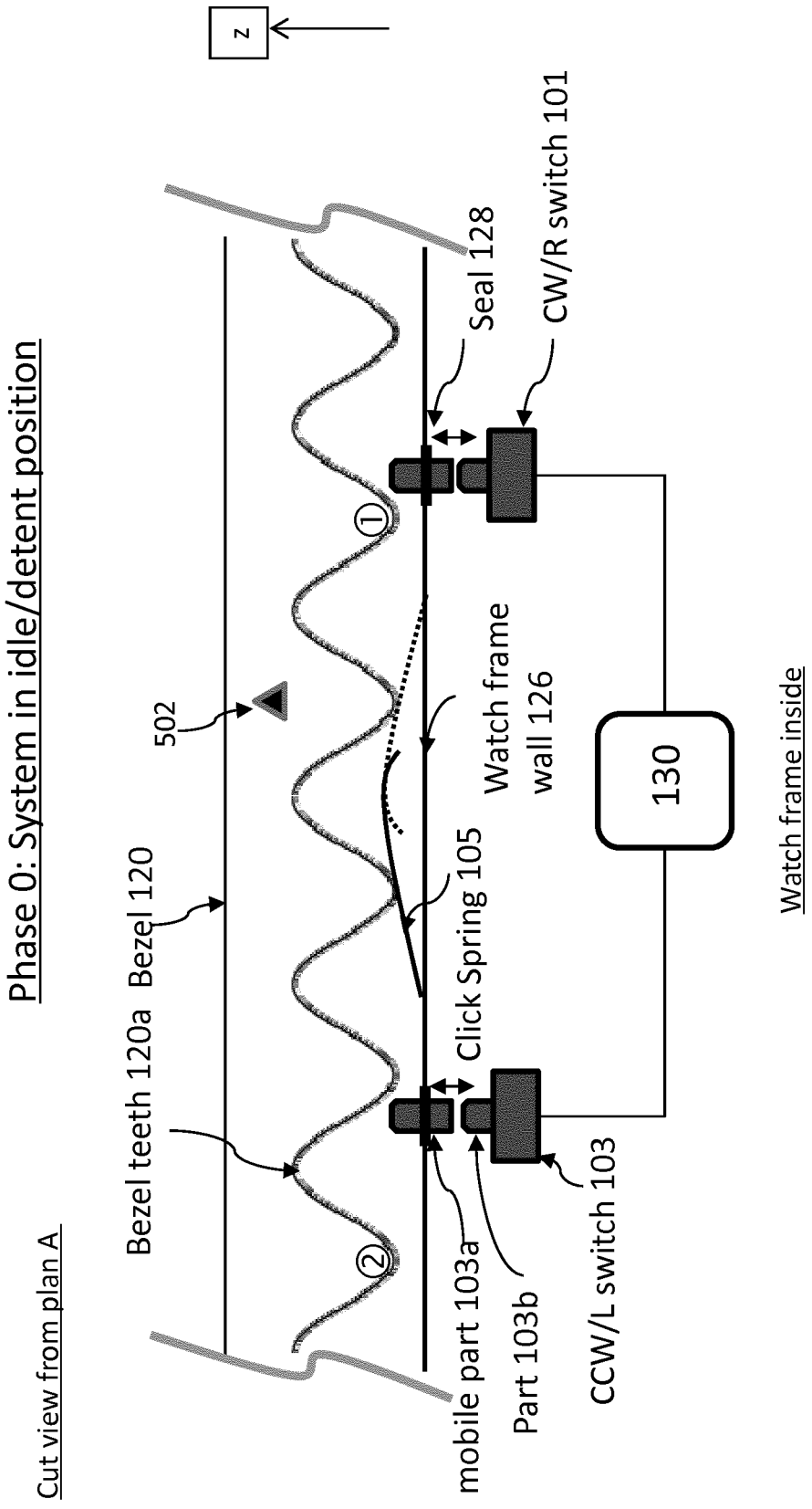
FIGS. 5a-5e illustrates an embodiment of a bezel rotation employing the present invention.

FIG. 5a illustrates the rotating bezel system in a relative idle/detent state thanks to the click spring 105. Triangle 502 is used to illustrate the initial position and may show progression of bezel teeth during following step motion. In this idle position, both the left switch 103 and the right switch 101 remain released (i.e. not pressed/not asserted). The bezel 120 is held by the click spring 105 (or more click springs not shown). According to the right and left switch property illustrated by FIG. 4, the right switch is closer to bezel tooth ① than the left switch to the bezel tooth ② at the moment of FIG. 5a.

Figure 5B:
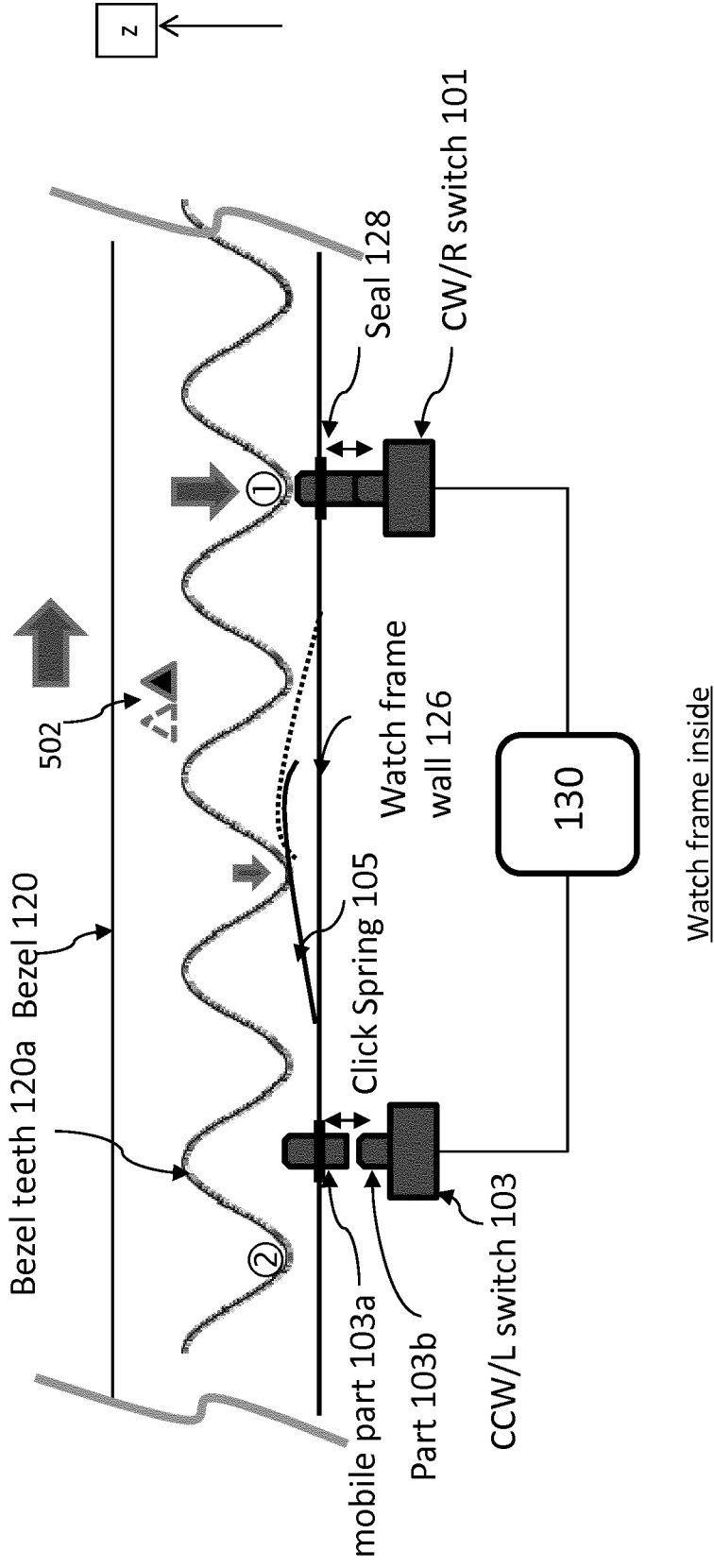

FIG. 5b illustrates the bezel rotates clockwise (e.g. one step to the right). Tooth ① presses the right switch 101 down. As shown in FIG. 5b, mobile part of the right switch 101 is pressed down to make contact with lower part of the right switch. The left switch 103 is not pressed.

Figure 5C:
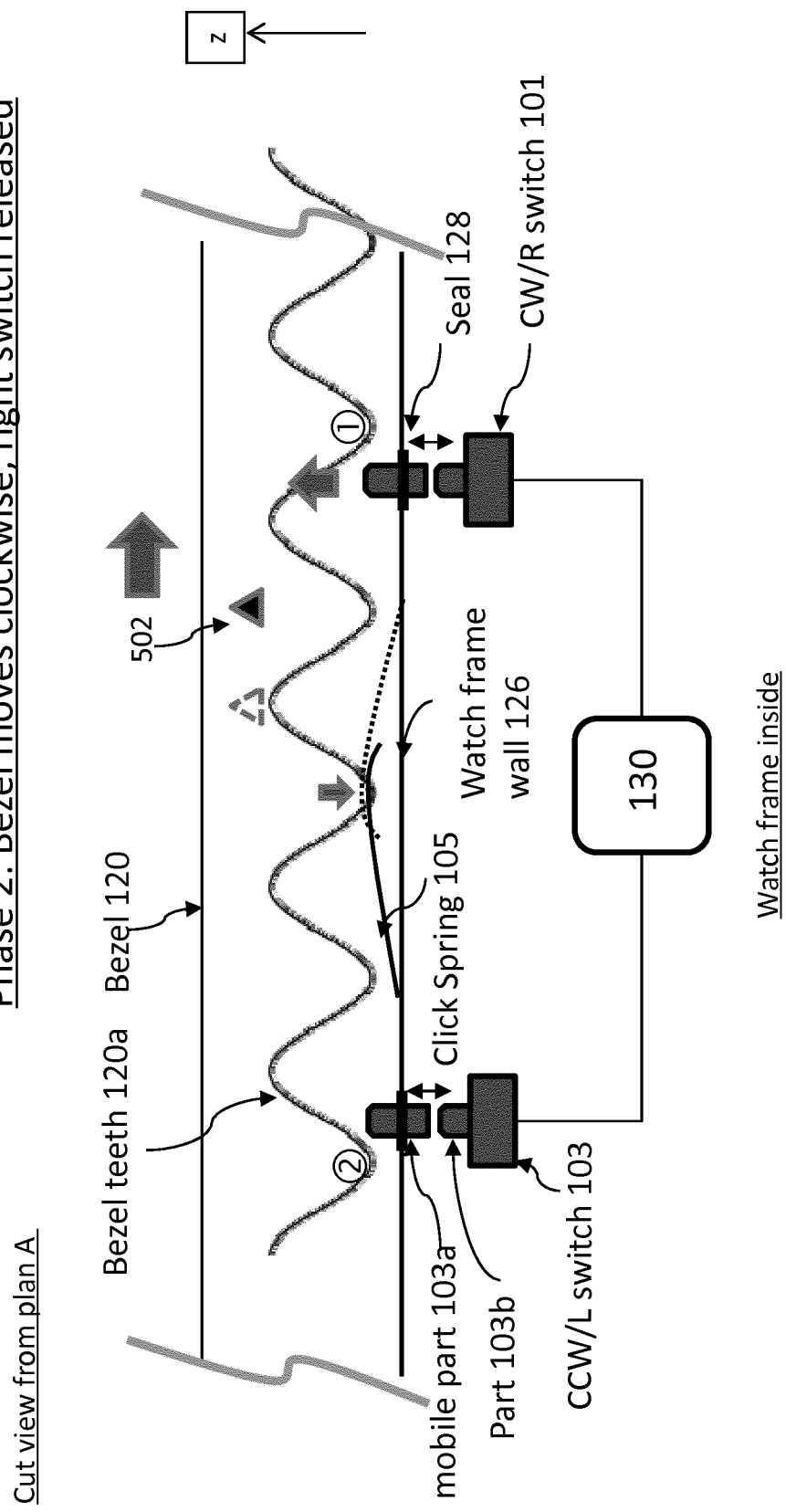

FIG. 5c illustrates the bezel continuing to rotate clockwise (e.g. one step to the right). The right switch 101 is released. As shown in FIG. 5c, the mobile part of the right switch is released, to leave/release contact with the lower part of the right switch. The left switch 103 is not pressed.

Figure 5D:
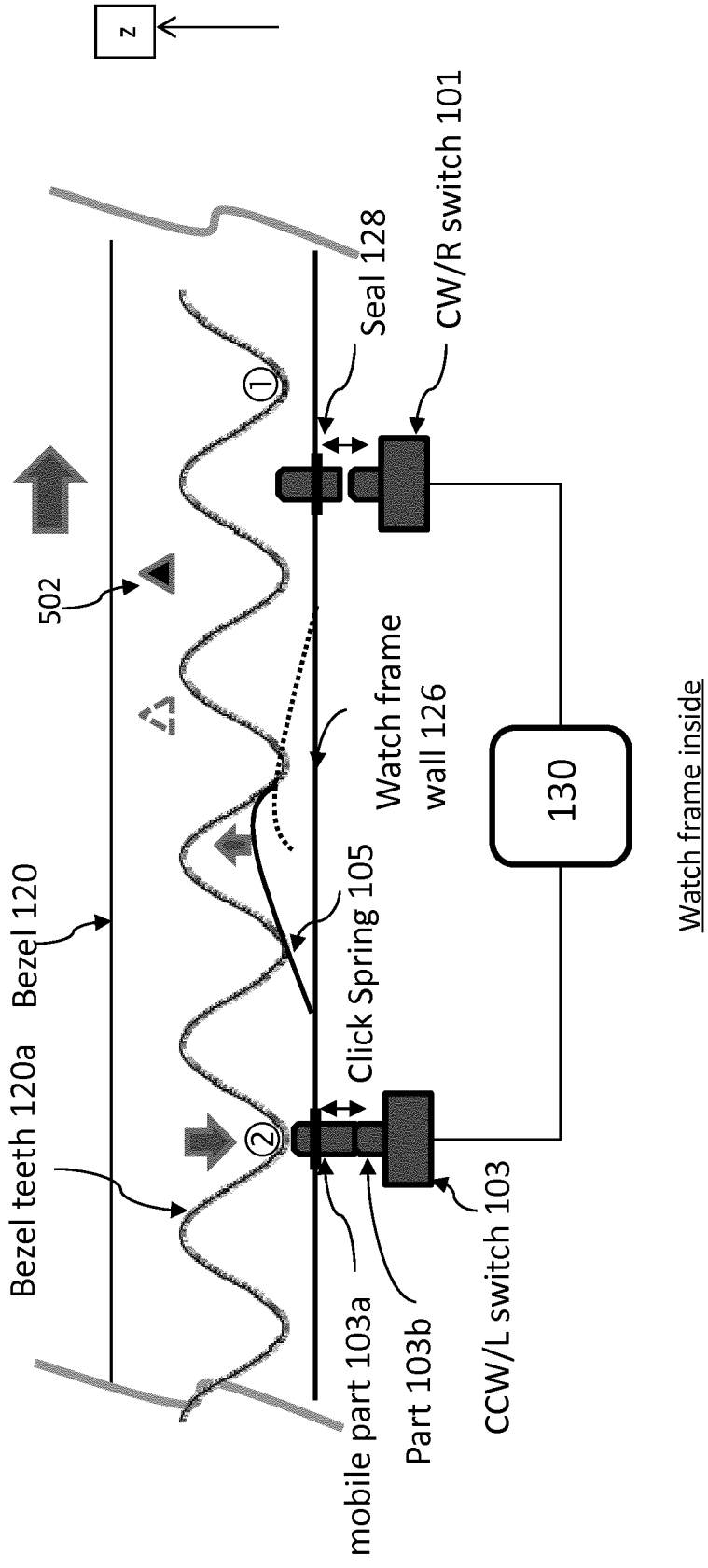

FIG. 5d illustrates the bezel continues to rotate clockwise (e.g. one step to the right). Tooth ② presses the left switch 103 down. As shown in FIG. 5d, mobile part of the left switch is pressed down to make contact with lower part of the left switch. The right switch 101 is not pressed.

Figure 5E:
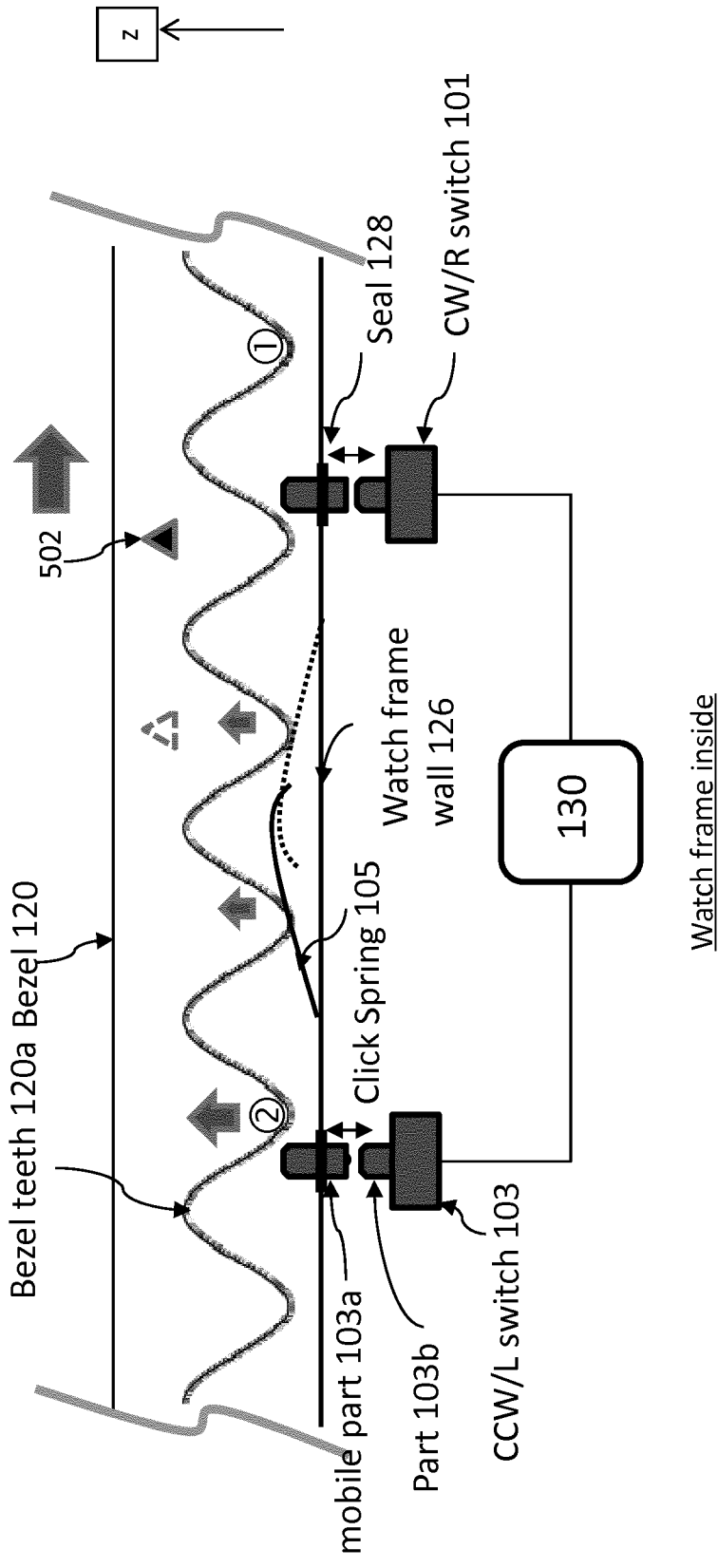

FIG. 5e illustrates the bezel continuing to rotate clockwise (e.g. one step to the right). The left switch 103 is released. As shown in FIG. 5e, the mobile part of the left switch is released to leave/disengage contact with the lower part of the left switch. The right switch 101 is not pressed. The bezel 120 ends its one step clockwise rotation and returns to idle position (i.e. both switches are not pressed).

FIGS. 5a-5e illustrate the bezel moving one step clockwise to generate an event that the CW/R switch 101 is first pressed and then the CCW/L switch 103 is pressed. This event, or sequence of at least two switches being sequentially pushed, can be easily detected with a tiny/low power microprocessor/microcontroller 130. Each switch is connected to a dedicated GPIO of the microprocessor 130. Assertion on the GPIO can trigger an associated callback interruption routine. As aforementioned, interruption oriented routine can be used by the microcontroller 130 to convert rotation of the bezel 120 into event/control signal to enrich interface of the smart watch 102. Interruption oriented routine has the advantage to possibly halt the microprocessor during the idle phase and then save power.

Figure 6:
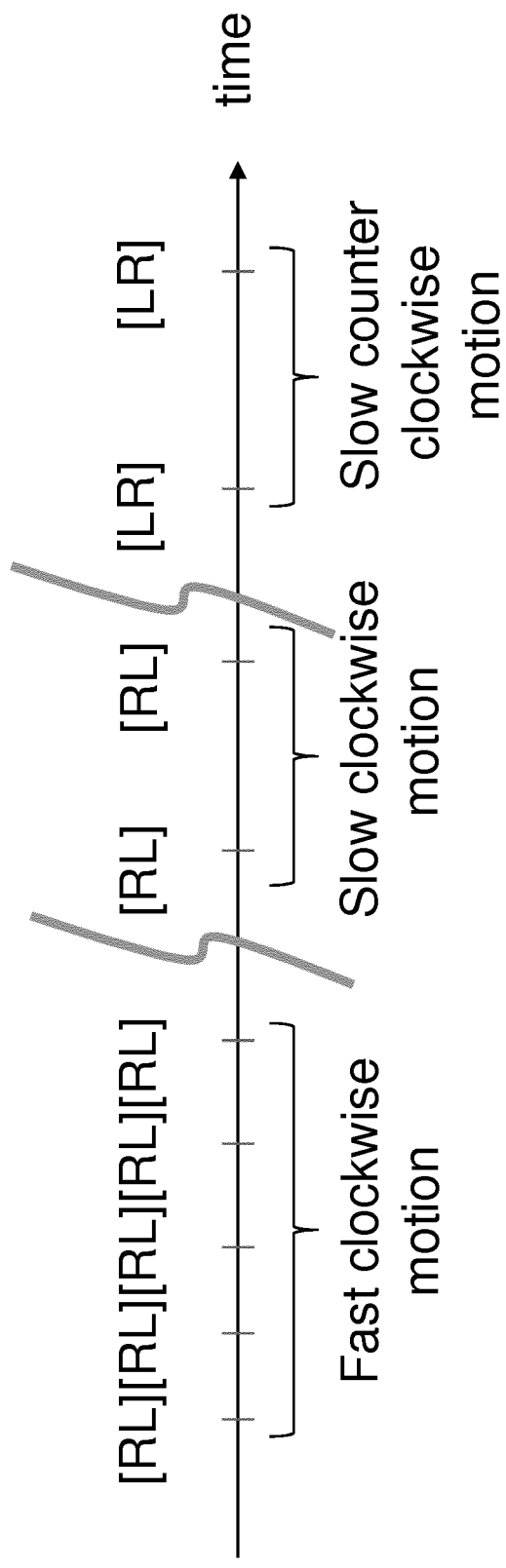
FIG. 6 illustrates embodiments of estimating a speed of bezel rotation.

FIG. 6 illustrates embodiments of estimating a speed of bezel rotation. Besides sensing bezel rotation event, sensing bezel rotation direction (i.e. clockwise, counterclockwise), and sensing bezel's position relative to the housing of a wearable electronic device (e.g. a smart watch), which have been discussed in detail in various embodiments, rotation speed of a rotating bezel can also be estimated/detected. The rotation speed can be estimated by time stamping a step event and measuring elapsed time with the previous one. For example, the elapsed time between a first pair of switches being pressed (first event) and a second pair of switches being pressed (next event) is short enough to justify an event of a fast bezel rotation. The elapsed time between a first pair of switches being pressed (first event) and a second pair of switches being pressed (next event) is long enough to justify an event of a slow bezel rotation. A person skilled in the art will readily appreciate that other methods are of course within variation of this invention, e.g. estimating rotation speed by measuring event frequency. For example, as illustrated in FIG. 6, if five [RL] sequences are detected/estimated, for a given time period, a fast clockwise motion of the bezel 120 may be determined; if two [RL] sequences are detected, a slow clockwise motion of the bezel 120 may be determined; if two [LR] sequences are detected, a slow counterclockwise motion of the bezel 120 may be determined. A person skilled in the art will readily appreciate that by measuring elapsed time between two switches being sequentially pressed an estimation of a speed of bezel rotation is possible. For example, the elapsed time between a first switch being pressed and a second switch being pressed is short enough to justify an event of a fast bezel rotation. The elapsed time between a first switch being pressed and a second switch being pressed is long enough to justify an event of a slow bezel rotation.

A person skilled in the art will readily appreciate that speed of bezel rotation can bring rich information that can be exploited by user interface design of an electronic device (e.g. an aforementioned smart watch, or any other wearable electronic devices). For example, navigation within an alphabetical/menu list can be facilitated while jumping from letter/item to letter/item with a high speed rotation and from one item to the next or a previous one with a low speed rotation; Zooming in/out a picture can be facilitated with a speed responding to speed of bezel rotation.

FIGS. 7a-7d illustrate embodiments of a click feature which can be combined with the rotating bezel mechanism. Besides sensing bezel rotation event, sensing bezel rotation direction (i.e. clockwise, counterclockwise), sensing speed of bezel rotation, which have been discussed in detail in various embodiments, a click feature can be further added to enrich user experience and user interface design of an electronic device (e.g. an aforementioned smart watch, or any other wearable electronic devices).

To support this feature, bezel 120 can offer a possible motion in z-axis, i.e. substantially perpendicular to the surface of a display (e.g. display surface of a smart watch). The idle position in the z-axis is maintained by one or more click springs. The click springs are elastic and allow a user to push the bezel in a lower z position (z click). One or more click switches are arranged to cooperate with the bezel teeth. Particularly, one or more switches are triggered in the lower-z position; and user's click can then be detected thanks to a microcontroller/microprocessor 130.

Figure 7A:
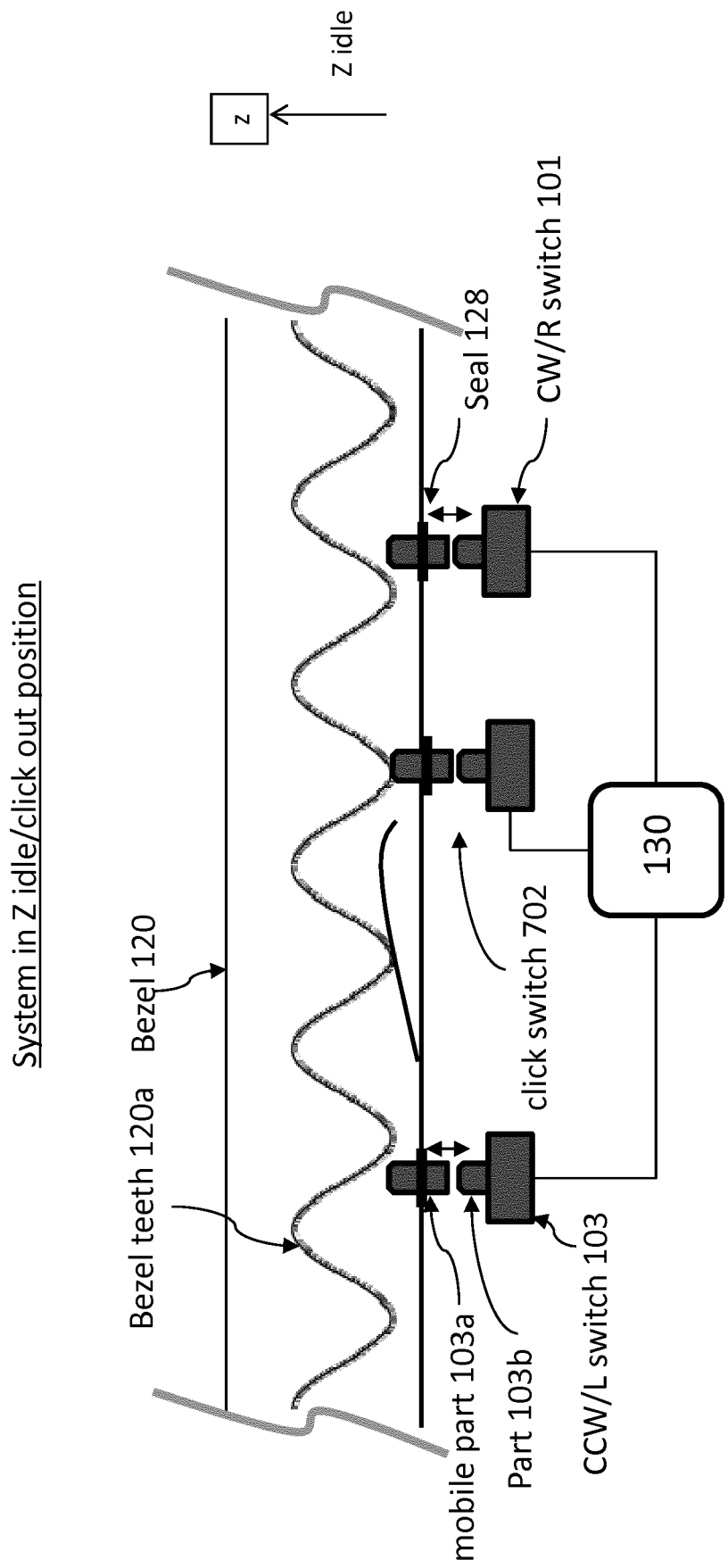
FIGS. 7a-7d illustrate embodiments of a click feature employing the present invention.
Figure 7B:
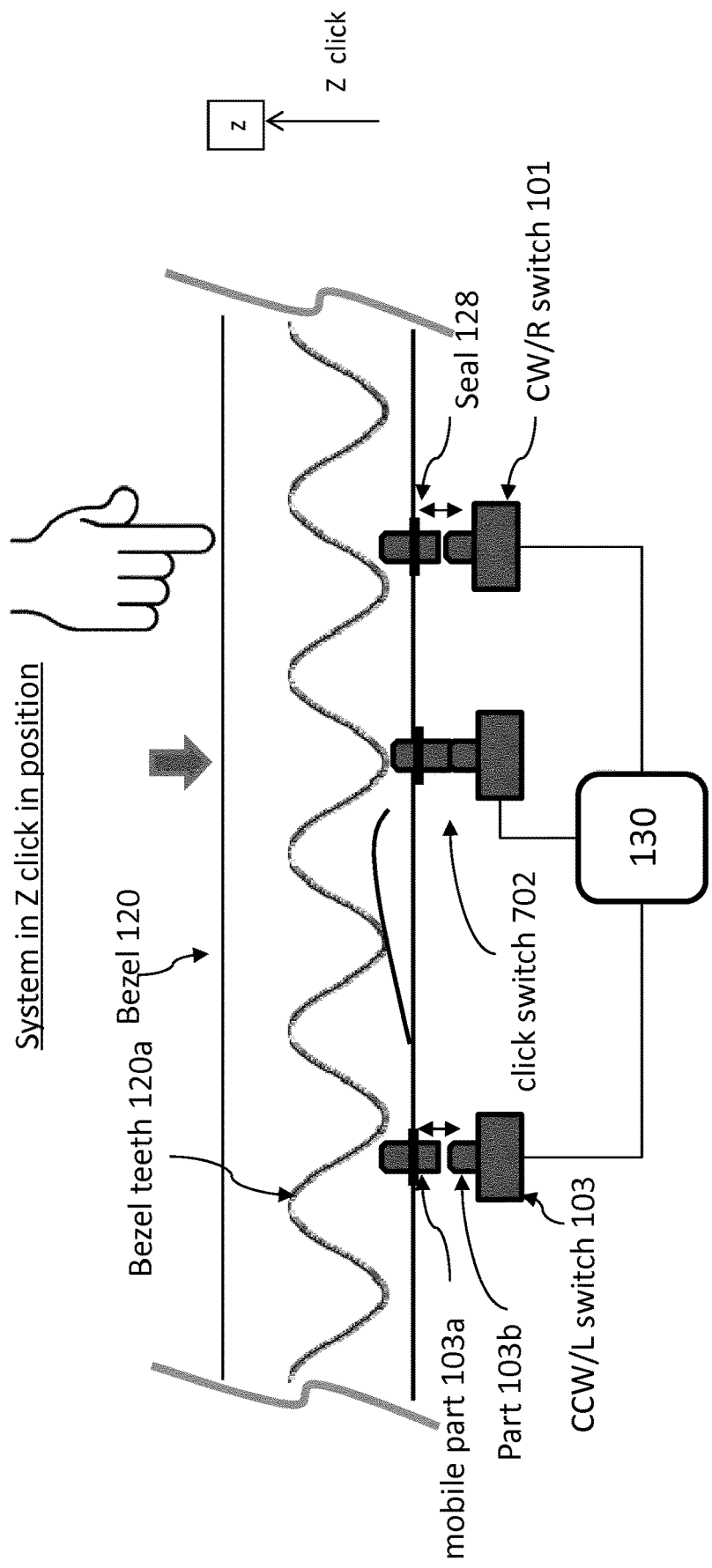

The click switch may be a dedicated switch 702 as illustrated in FIGS. 7a-7b. When bezel 120 is pressed/pushed towards a lower z position, click switch 702 is pressed/pushed to signal an event to microprocessor 130. When bezel 120 returns to its idle position, click switch 702 is released to signal another event to microprocessor 130. Alternatively, when bezel 120 is pressed towards a lower z position, click switch 702's mobile part contacts lower part of click switch 702; then bezel 120 returns to idle position thanks to elastic click spring, click switch 702's mobile part departs from lower part of click switch 702. Such a click in and out event is detected/estimated by the microprocessor 130. In these embodiments, only a limited line of code is necessary for the microprocessor to detect a click in, a click out, and a click in and out event. A person skilled in the art will readily appreciate that such a click feature can also be coded with an interruption routine to preserve power consumption.

Figure 7C:
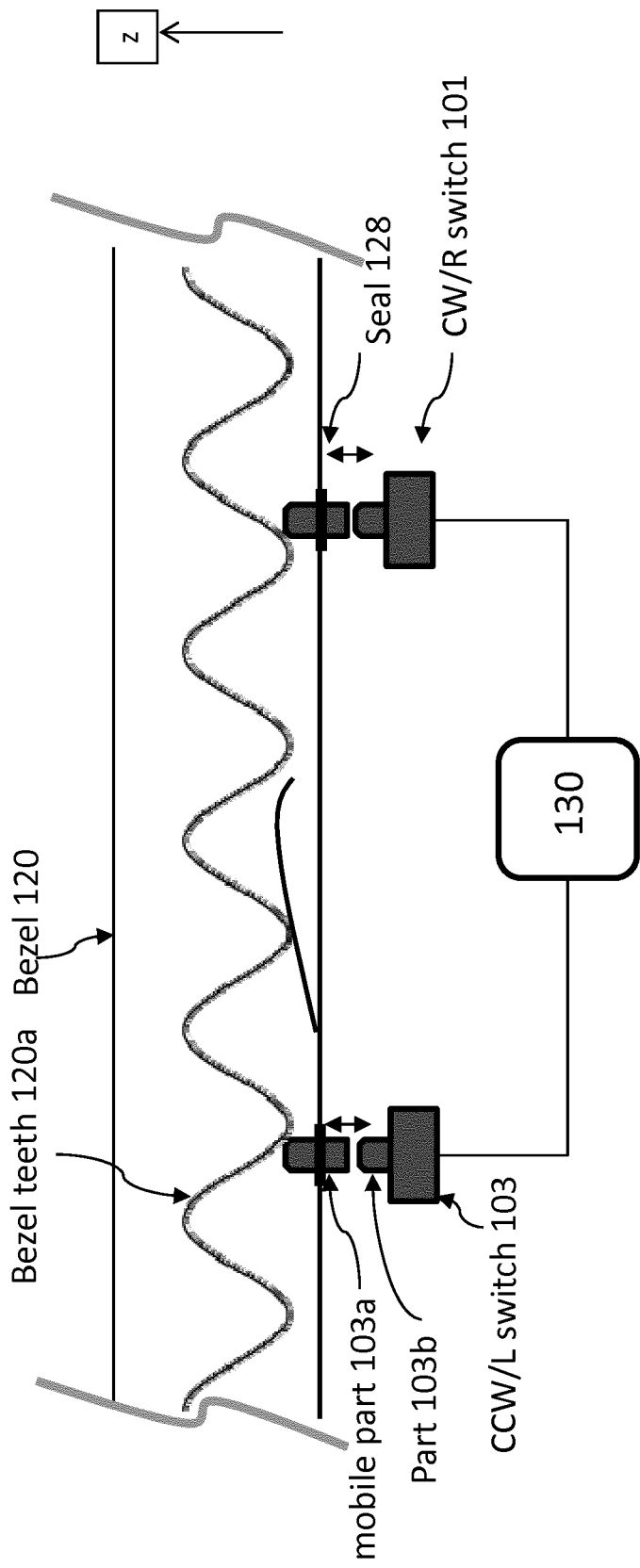
Figure 7D:
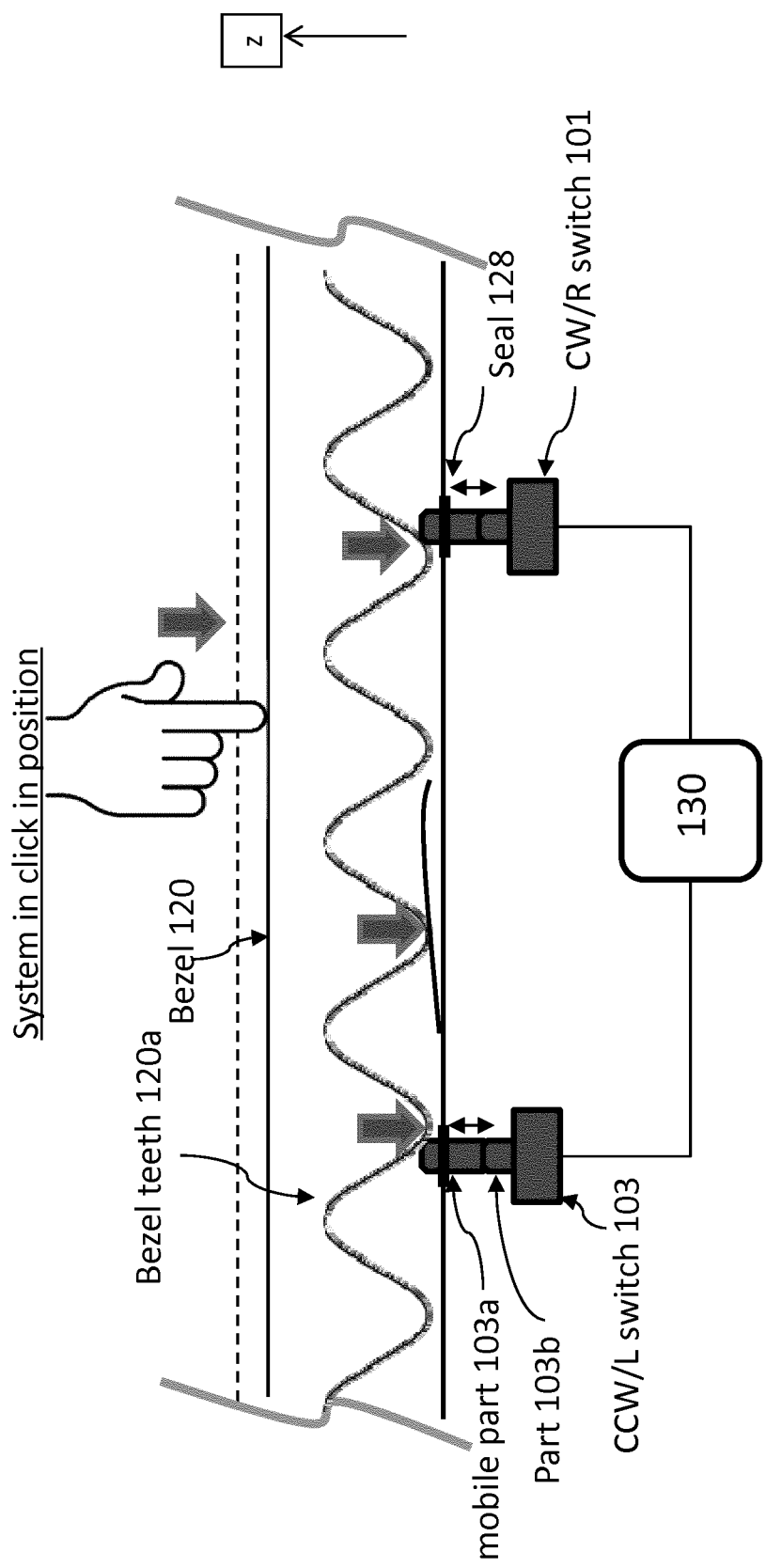

Yet, in other embodiments, "existing" CCW/L switch 103 and CW/R switch 101 may be reused to support a click feature. Reuse existing switches can minimize mechanical impact compared with the dedicated switch mechanism for click feature approach. As illustrated in FIGS. 7c-7d, when bezel 120 is pushed/pressed (e.g. towards a lower z position), both switches 101/103 are activated, that is, pressed/asserted. When bezel 120 returns to idle position (e.g. when outside force is removed/ceased), both switches 101/103 are released, that is, deactivated/unasserted. When the bezel 120 is pushed/pressed towards a lower z position, the bezel is slightly rotated to almost simultaneously activate, that is, press "existing" CCW/L switch 103 and CW/R switch 101 (i.e. 101 and 103 are activated/pressed together). A detecting of two switches being almost simultaneously activated/pressed can indicate a click event. In these embodiments, only a limited line of code is necessary for the microprocessor to detect a "simultaneous" click in, a "simultaneous" click out, and a "simultaneous" click in and out event, meanwhile differentiating a bezel rotation. A person skilled in the art will readily appreciate that such a click feature can also be coded with an interruption routine to preserve power consumption.

As aforementioned, the switch position is free around the bezel circle. Only the relative position of the Left and Right switches regarding the bezel teeth matters to assure the bezel motion detection (e.g. aforementioned L1 and L2 property). Moreover, the number of switches is not limited. Although more than two switches may bring complexity into mechanical design and challenge for an already constrained inner space of a small electronic device, it can bring a useful backup feature in case of a breakdown of one switch (or two switches of different nature).

Figure 8:
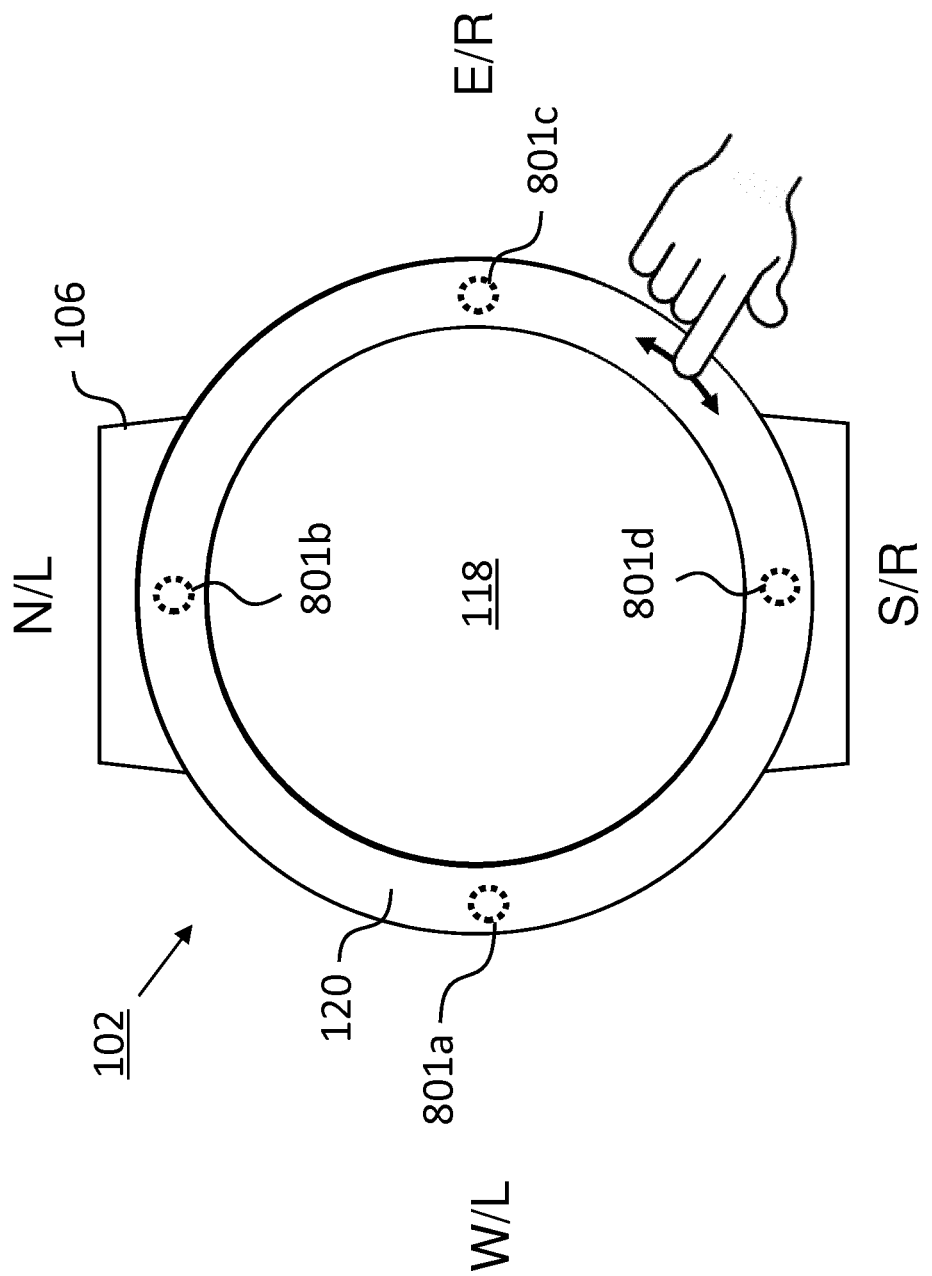
FIG. 8 shows a schematic top view of an electronic device in the form of a smart watch according to an embodiment.

FIG. 8 shows a schematic top view of an electronic device in the form of a smart watch according to an embodiment. In FIG. 8, an embodiment of such mechanism of open position for switches (i.e. switches may be placed anywhere in a bezel circle) and redundant switches (e.g. more than two switches) is shown. The first pair of West/Left and East/Right (respectively 801a and 801c) switches (i.e. a set of cooperating switches) are placed near 9 o'clock and 3 o'clock; and a redundant pair of North/Left and South/Right (801b and 801d) switches (i.e. another set of cooperating switches) are placed close to 12 o'clock and 6 o'clock. The placement of these switches could have been other positions around the clock. Preferably, equally spaced positioning (e.g. 3, 6, 9, 12 o'clock, or 1, 4, 7, 10 o'clock, etc) may bring other useful properties that will be described later in this disclosure. A person skilled in the art will readily appreciate that 4 switches (i.e. two sets of cooperating switches) are used only as an example, more than 4 (e.g. 6, 8 etc.) switches (i.e. more than two sets of cooperating switches) may be used as variations of this invention. A person skilled in the other will readily appreciate that 4 equally spaced positions are used only as an example; more than 4 equally (or not equally) spaced positions may be used as variations of this invention.

When all switches function normally, the bezel motion can be detected twice thanks to the two pairs of switches {801a, 801c} and {801b, 801d} that generate twice the switch sequence. In case of failure of one switch or two switches of different nature, the bezel motion can still be detected because one switch sequence still exists thanks to the redundancy mechanism of switches. For example, in a case that switch 801a fails, switch sequence provided by switch pair {801b, 801d} is still detectable; in a case that switch pair {801b, 801d} fails, switch sequence provided by switch pair {801a, 801c} is still detectable. This property is useful and brings a higher reliability to the system. Moreover, other useful properties can be cumulated thanks to the open position and the multiplicity of the switches.

FIGS. 9a-9i illustrate embodiments of a located click feature employing the present invention.

Figure 9A:
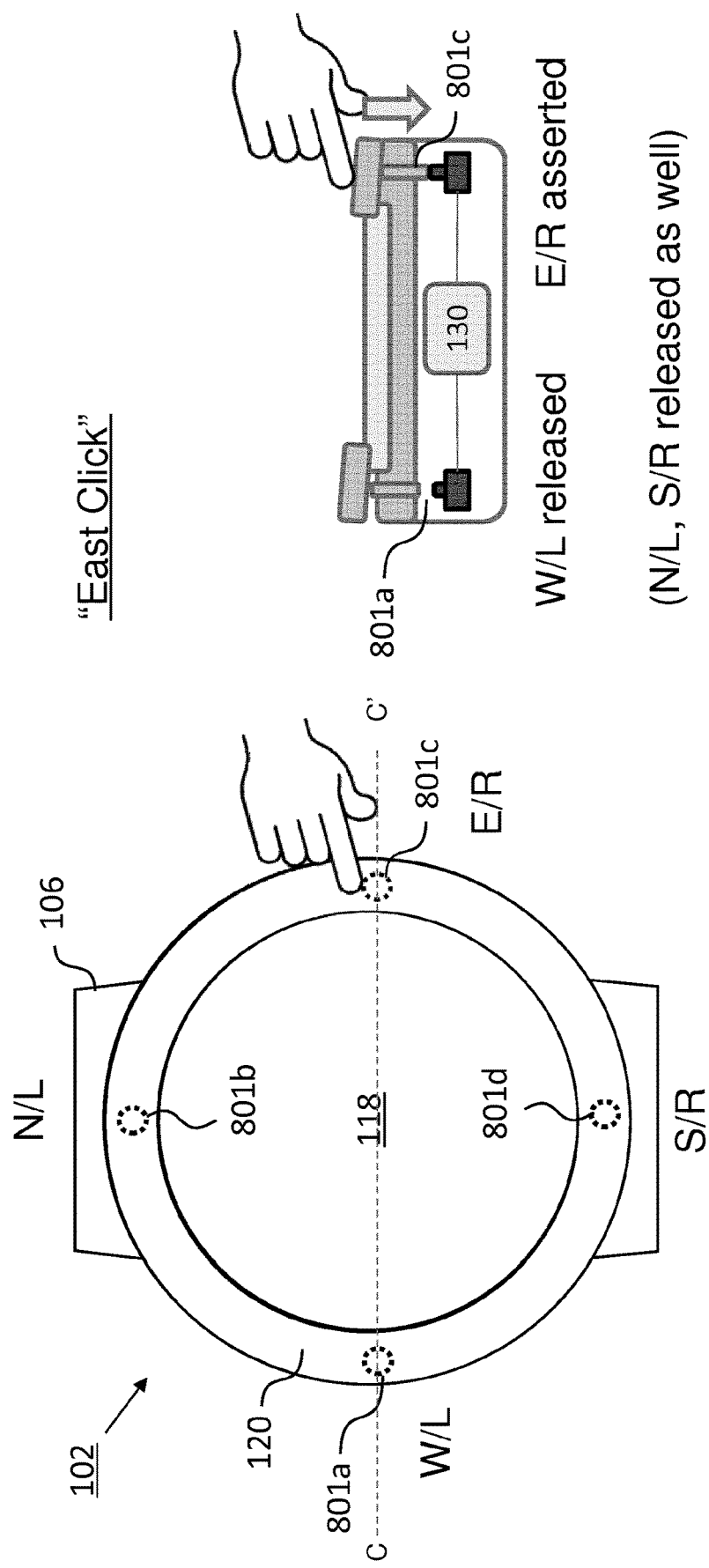
FIGS. 9a-9i illustrate embodiments of a located click feature employing the present invention.
Figure 9B:
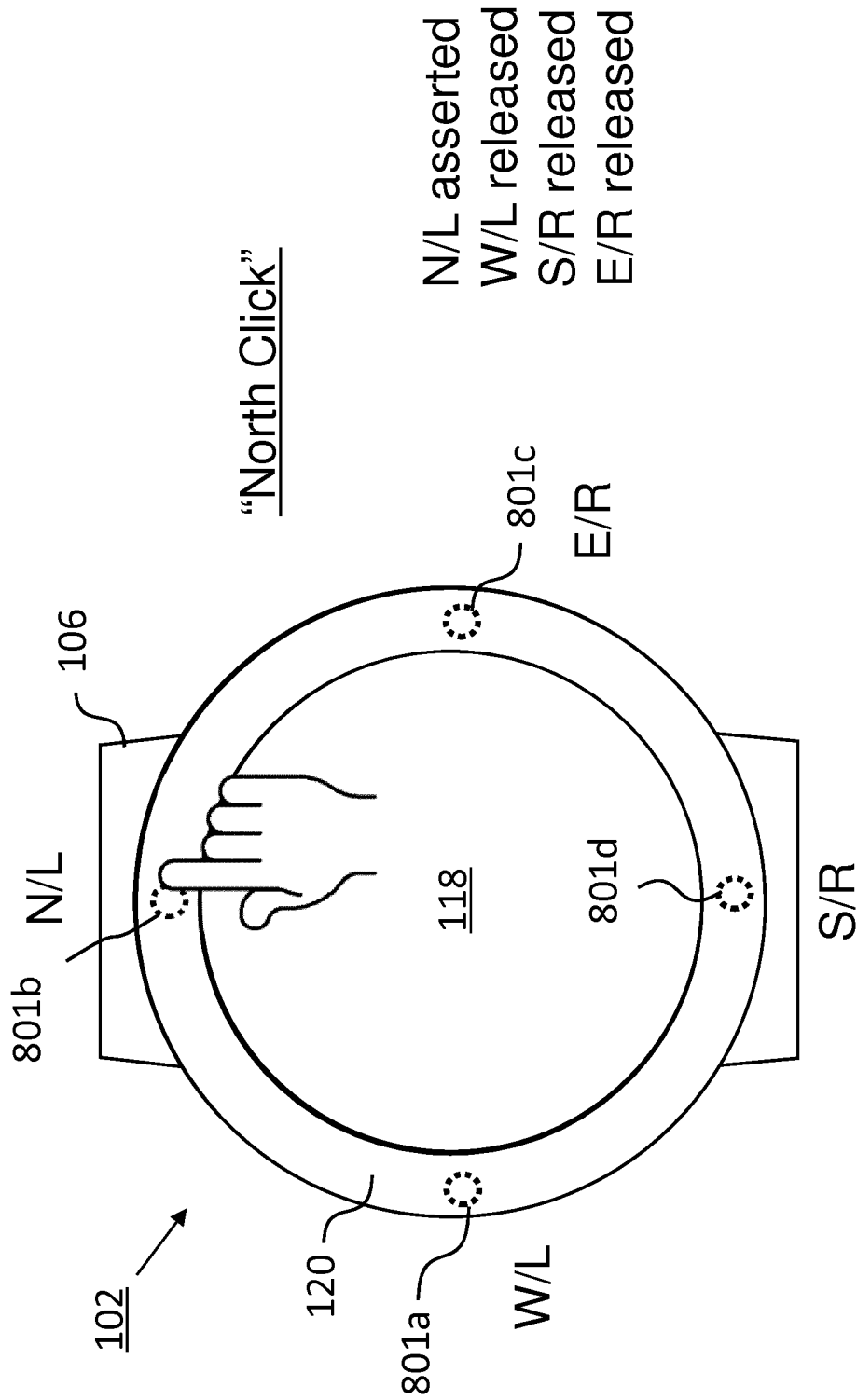
Figure 9C:
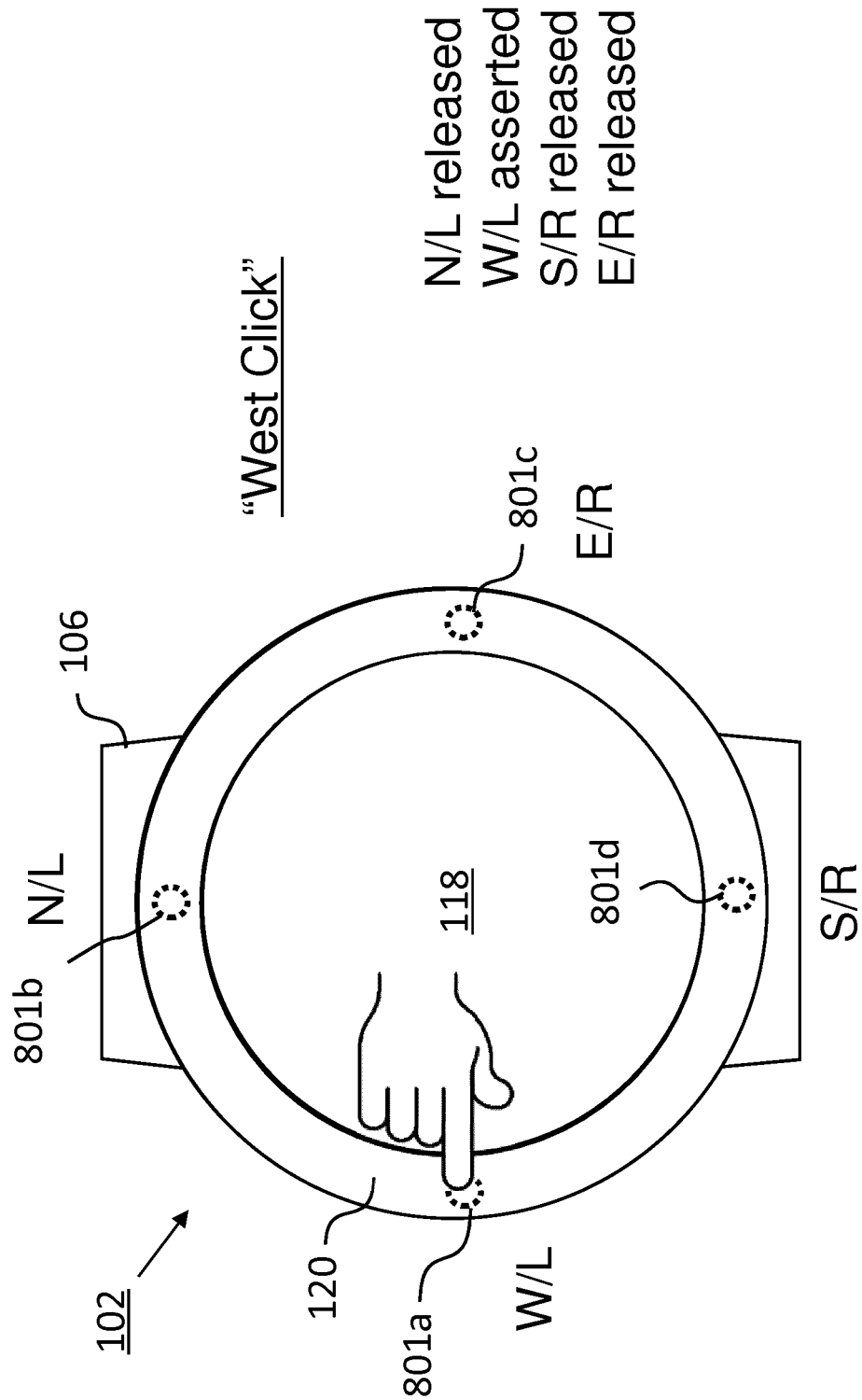
Figure 9D:
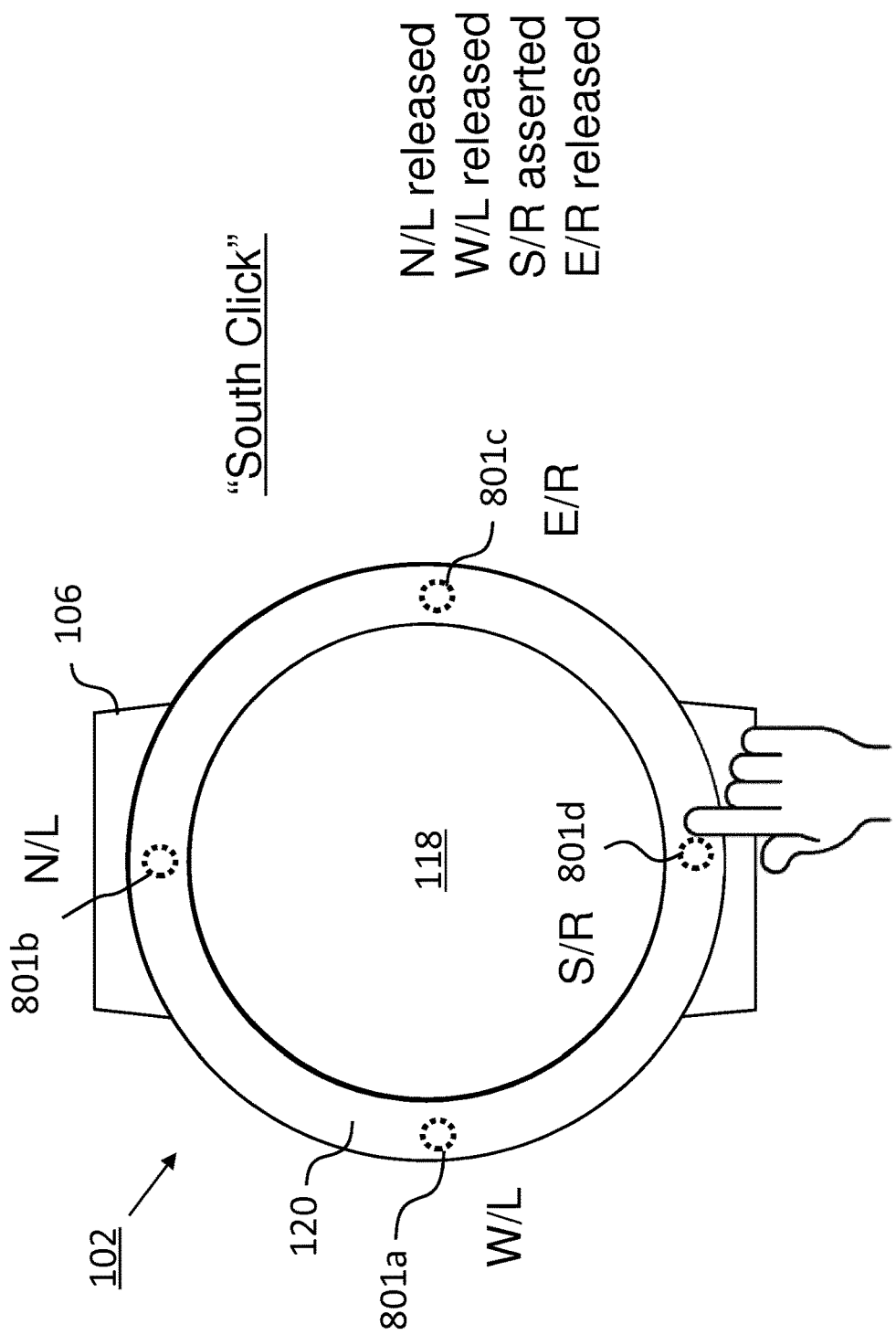

By adding a degree of freedom on the z-axis for the bezel ring, a located click feature can be offered. This is illustrated in FIG. 9a where a user presses the bezel locally around 3 o'clock. This pressure locally lowers the bezel in this region and pushes the E/R (801c) switch while the other switches remain not activated/unasserted. This highlights an "East Click" and shows the benefits of a free positioning of switches. FIGS. 9b, 9c', 9d show respectively the North, West and South clicks. Separately, or on top of the rotatable bezel detection, a North/East/South/West navigation "buttons" can then be offered and thus enrich user interaction with a smart watch.

Figure 9E:
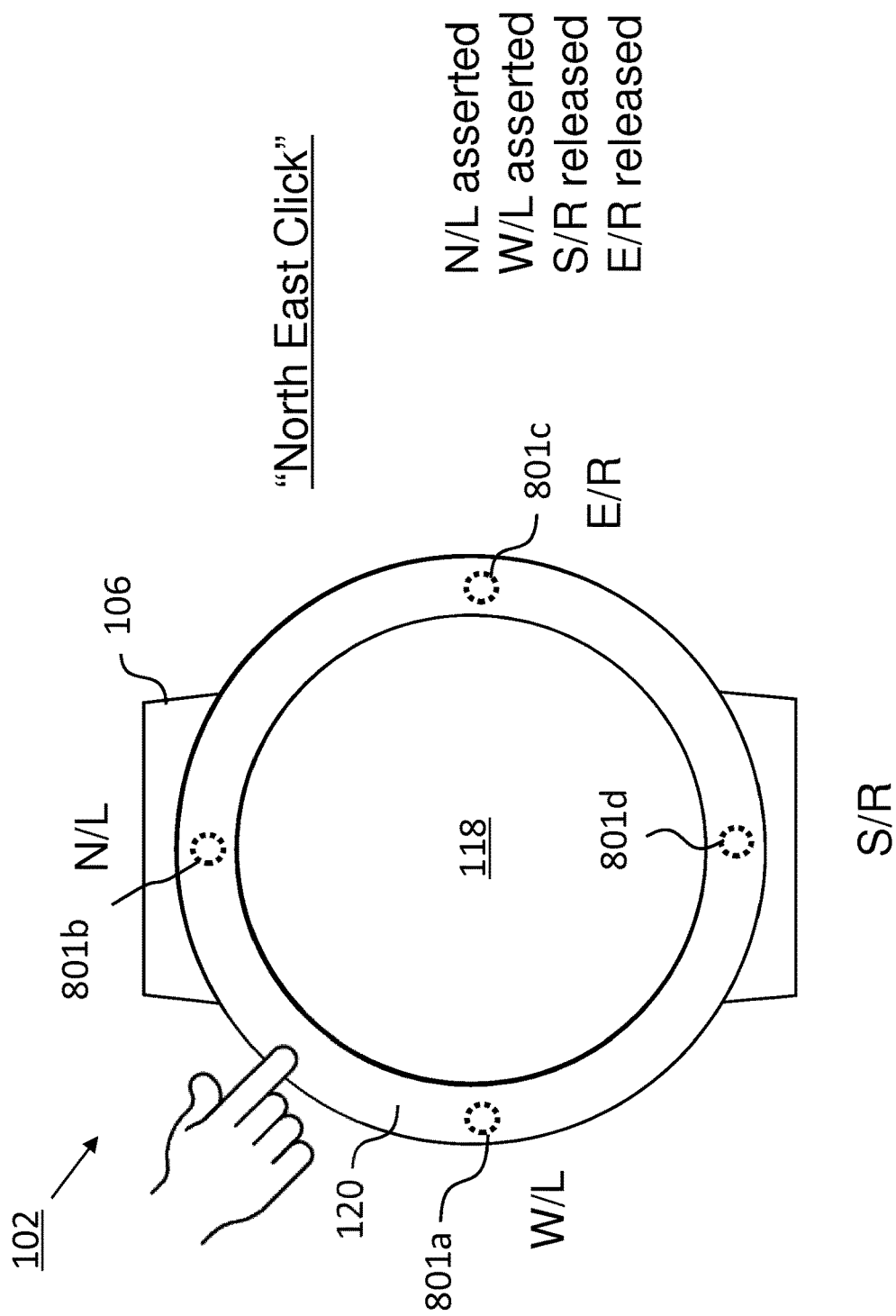
Figure 9F:
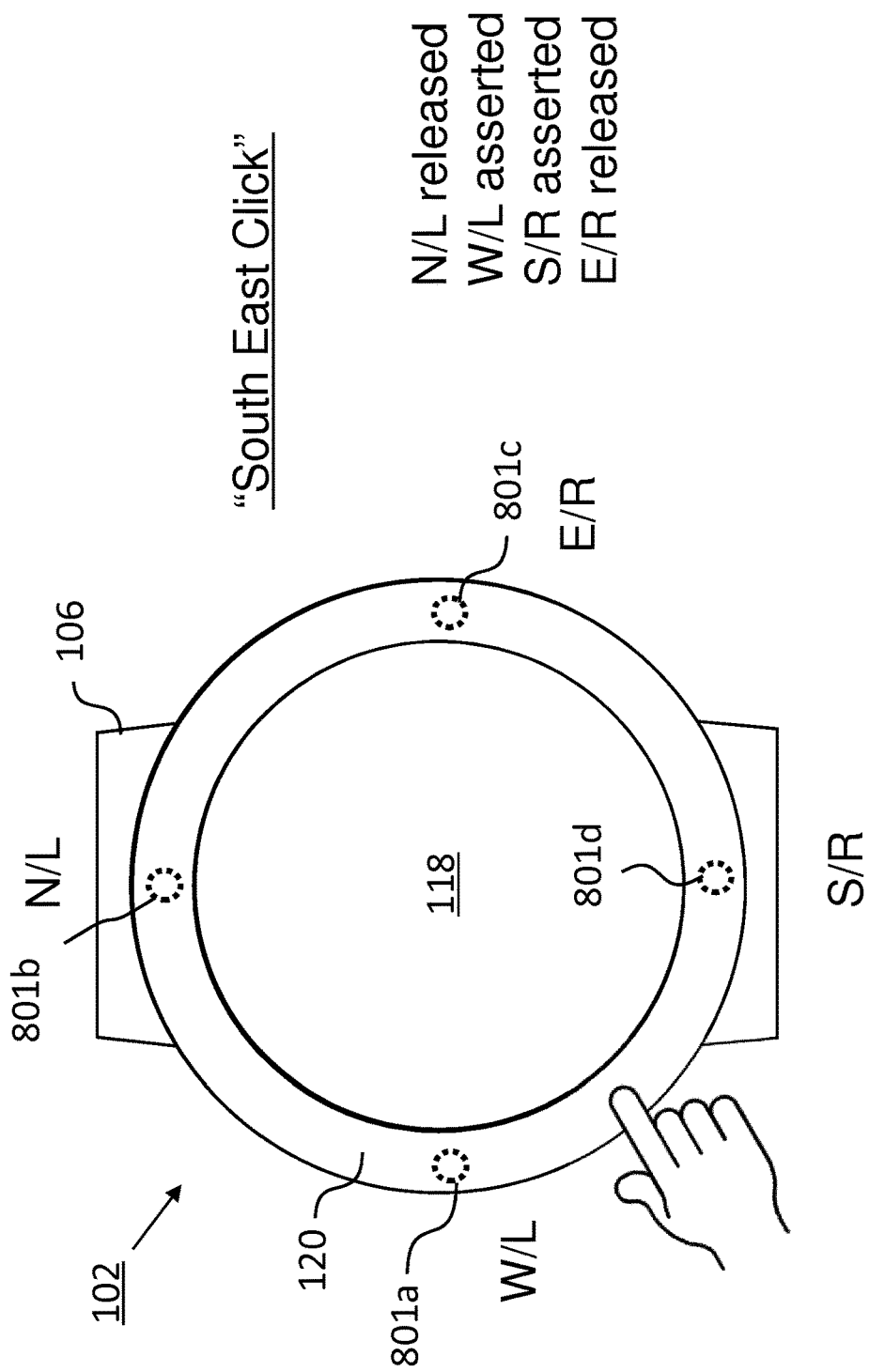
Figure 9G:
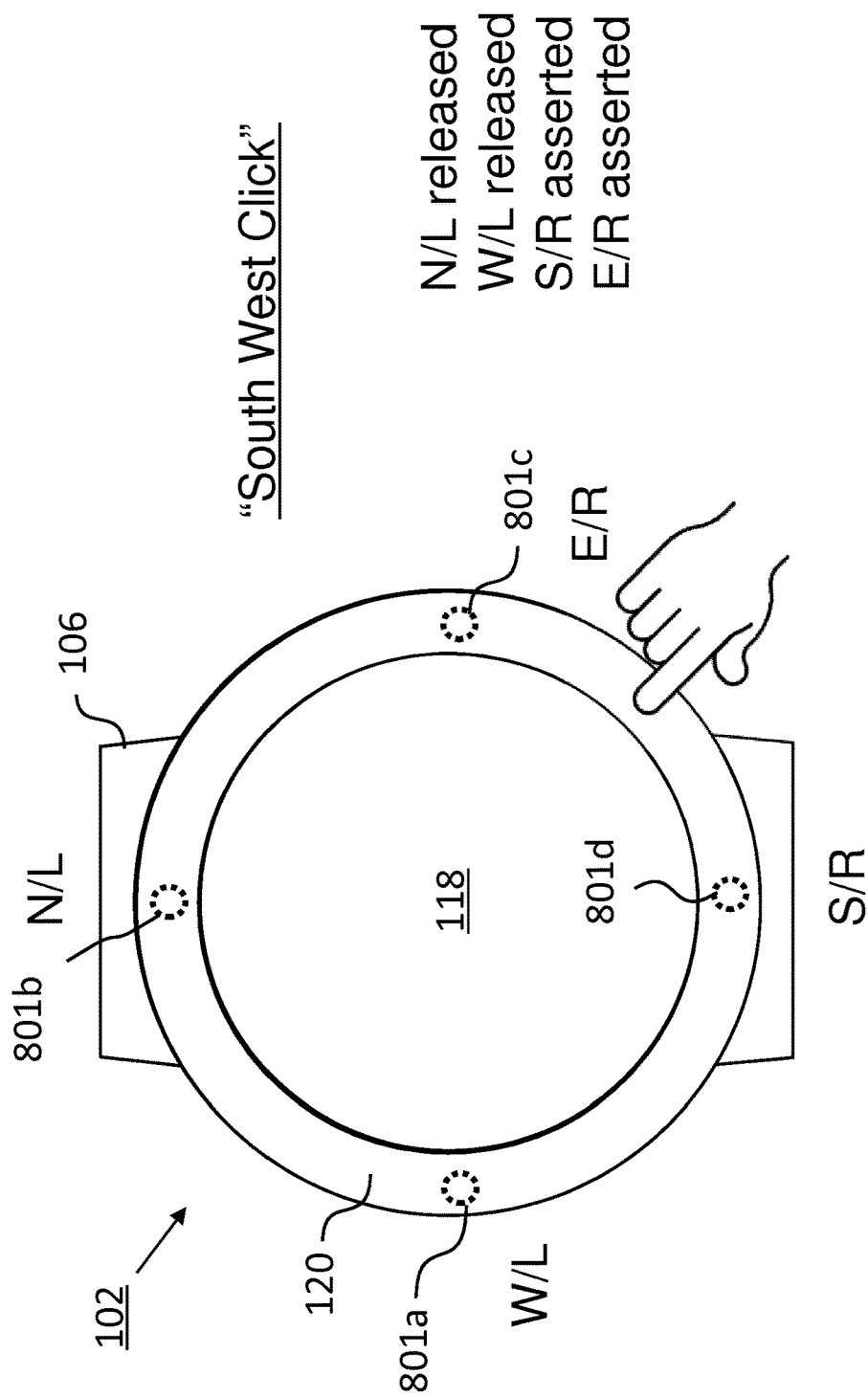
Figure 9H:
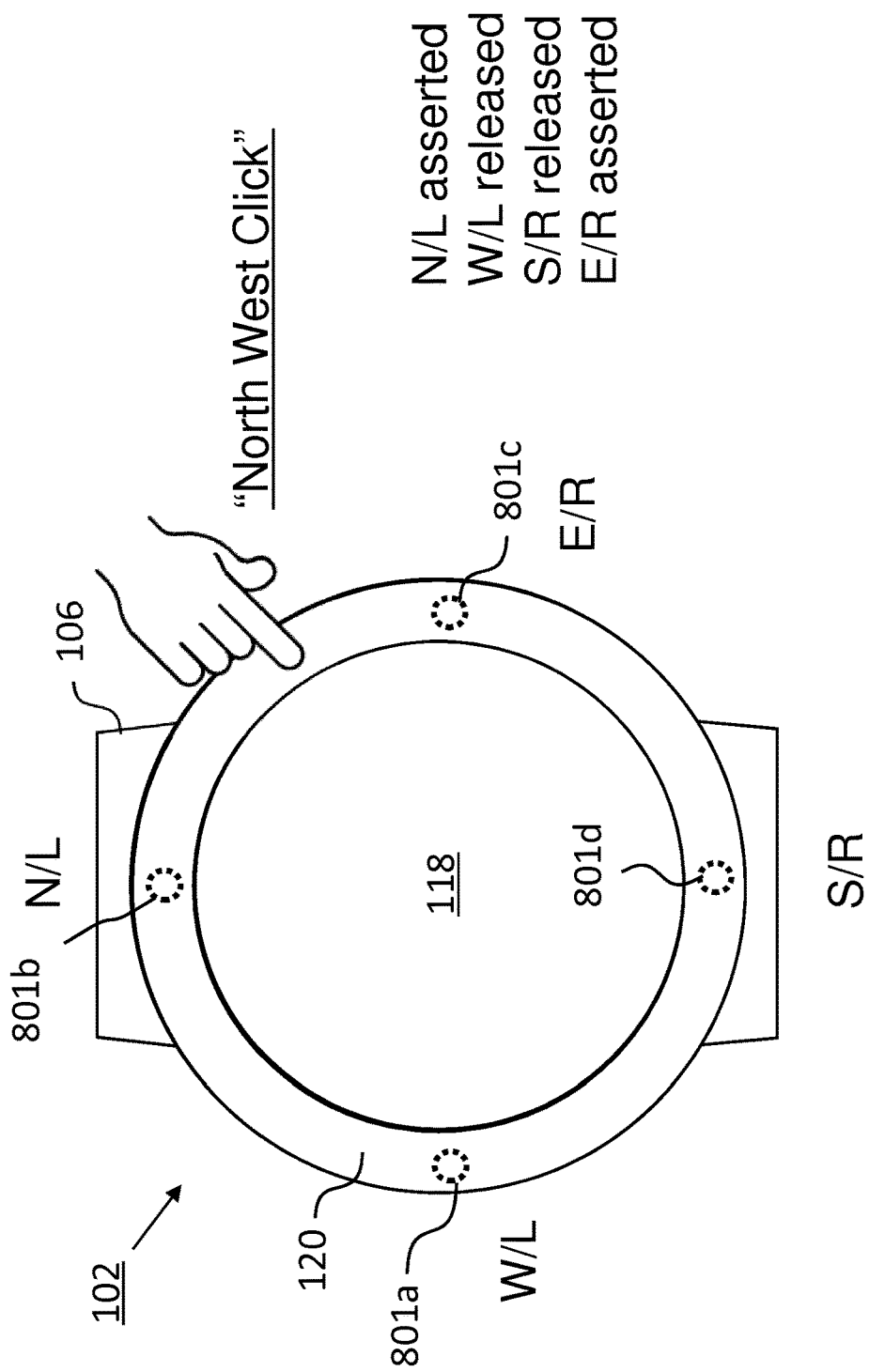

Moreover, more subtle mechanical interactions can be envisaged with the bezel's z-axis freedom and local pressing. For example, a North+East Click can be detected if the user pushes into a region that assert the North and the East switches together while the West and South switches remain not activated/unasserted. This is illustrated in FIGS. 9g, 9f, 9e respectively highlight a South+East, South+West, North+West clicks. This enriches navigation possiblities by offering 4 additonal directions, or click locations.

Figure 9I:
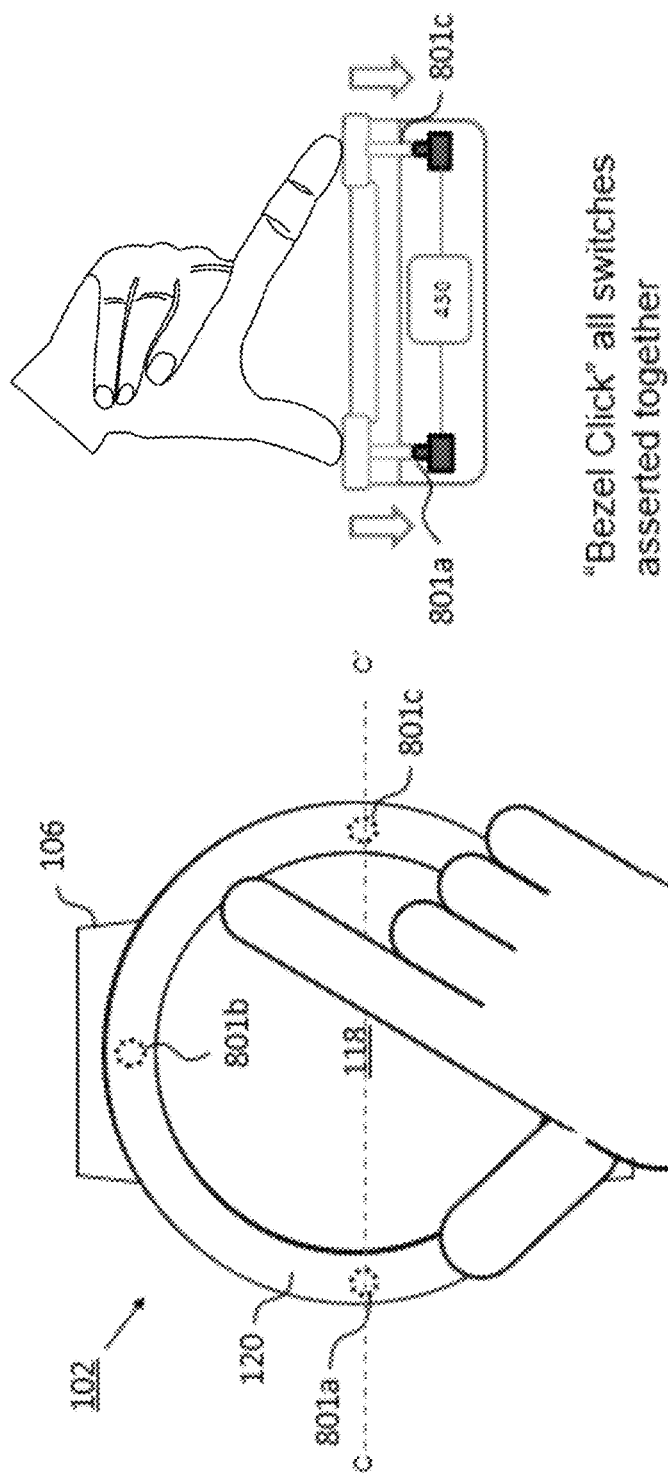

Finally, a bezel click can also be offered when all the switches are activated/asserted together. This could happen when the user pushes the bezel on two diametrically opposite points as illustrated in FIG. 9i featuring a "two finger" or Bezel click event. The whole bezel lowers around the clock and activates/asserts the 4 switches simultaneously (i.e. the 4 switches are activated/asserted all together).

A person skilled in the art will readily appreciate that, to support the located click feature, either dedicated switches or reusing "existing" switches can be used. In case of using dedicated switches to support the located click feature, similar to FIGS. 7a-7b, dedicated switches (e.g. dedicated North/East/South/West switches) are provided. In case of reusing "existing" switches, which can be used to indicate an event of bezel rotation when being sequentially activated, such as, pushed/pressed/asserted, when the bezel 120 is pushed/pressed towards a lower z position, the bezel is slightly rotated to almost simultaneously activate/press "existing" switches. A detecting of two (or more) switches being almost simultaneously activated/pressed can indicate a click event.

FIGS. 10a-10b illustrate embodiments of a located rotating feature employing the present invention.

Beside rotation detection backup, located click navigation and bezel click feature, the free positioning and redundancy of a plurality of switches can bring another useful property. As shown in FIG. 10a, the bezel ring 120 embeds teeth that are equally spaced (e.g. 24 teeth in the figure). Teeth cooperate with the switches during rotation phase by creating sequence of switches being activated/pressed. According to FIG. 10a, at each clockwise or counterclockwise step motion, 4 teeth cooperate with the 4 switches (801a, 801b, 801c, and 801d).

A broken/missing/ghost tooth within the bezel ring can be deliberately introduced to enrich user face design. In other terms, an asymmetry of bezel teeth can be introduced into the bezel system with a missing/broken/ghost tooth that does not cooperate with any switch during a step motion. FIG. 10b illustrates this purpose. The position of a missing/broken/ghost tooth is kept empty. Thanks to this property, an absolute position of the bezel 120 can be given as soon as a "non cooperation" or "ghost event" appears. For example, according to FIG. 10b, if the bezel is rotated clockwise (e.g. to the right), the S/R and E/R switches are first asserted and then the N/L switch. The W/L switch remains unasserted because the missing/broken tooth hasn't cooperated with it. This last event can be detected. For example: S/R then N/L sequence has been detected indicating a clockwise step motion but not the E/R and W/L sequence one. Supposing the W/L is not out of order (this can be confirmed later), then it means that the ghost/broken/missing tooth is at the W/L location explaining why the W/L remained not activated/unasserted. The absolute position of the bezel (e.g. 9 o'clock) is then known. This mechanism gives to the system additional information that can be used for enriching user interface design. Next motions of the bezel (clockwise or counterclockwise) may help to maintain the knowledge of the exact position of the bezel. Next motions can also help to know whether the W/L is working as soon as a new event is generated from an unbroken tooth. This absolute bezel position is known as long as the system is powered. After a system power outage, the absolute location can be resynchronized as soon as a 'ghost event' appears (e.g. a missing/broken/ghost tooth does not cooperate with a switch due to an empty position cooperate with a switch) during a motion step.

As a summary of aforementioned embodiments and variations thereof, but with no intention to limiting them, with the help of at least two switches (e.g. mechanical switches, button switches) collaborating with a rotating bezel (e.g. the bezel sequentially pushes the at least two switches while rotating), several events can be detected and used to enrich user interface design for a wearable electronic device (e.g. a smart watch). These events include but not limiting to:

Click in
Click out
Click in and out
Double or tripple Click (e.g. by timestamping multiple clicks)
Click in and rotate (clockwise or counterclockwise)
Clockwise rotation
Counterclockwise rotation
Fast/Slow Clockwise rotation
Fast/Slow Counterclockwise rotation
Located click around the bezel (e.g. Left/Right/Up/Down directions, or N/NE/E, SE, S, SW, W, NW directions)
Bezel/Two finger clicks
Absolute position of the bezel around the clock.

FIGS. 11a-11f illustrate embodiments of algorithms related to features of a rotatable bezel employing the present invention.

Figure 11A:
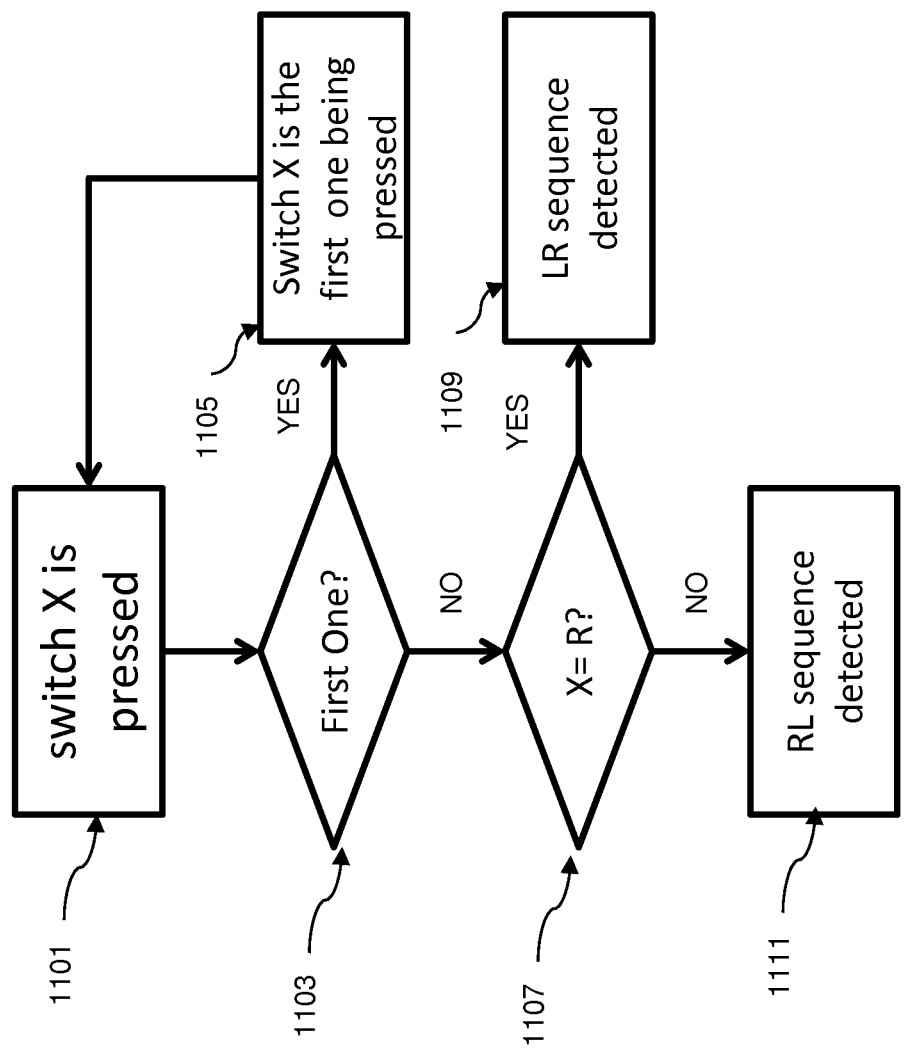
FIGS. 11a-11f illustrate embodiments of algorithms related to features of a rotatable bezel employing the present invention.

FIG. 11a illustrates an algorithm logic about how to determine an event of two switches (e.g. CCW/L switch 103, CW/R switch 101) being sequentially activated, such as, pressed/pushed/asserted. Two switches being sequentially pressed is also illustrated in FIGS. 5a-5e, and FIGS. 10a-10b.

In FIG. 11a, a switch X (i.e. the current switch, can be CCW/L switch 103 or CW/R switch 101) being pressed is detected (see block 1101). If switch X is the first switch being pressed, then the first switch being pressed is recorded (see block 1105). Otherwise, if switch X is the right switch (e.g. CW/R switch 101), which can mean a right switch is the second switch being pressed, then a LR sequence (e.g. counterclockwise rotation) may be detected (see block 1109). If switch X is not the right switch (e.g. X is CCW/L switch 103), which can mean a left switch is the second switch being pressed, then a RL sequence (e.g. clockwise rotation) may be detected (see block 1111).

Figure 11B:
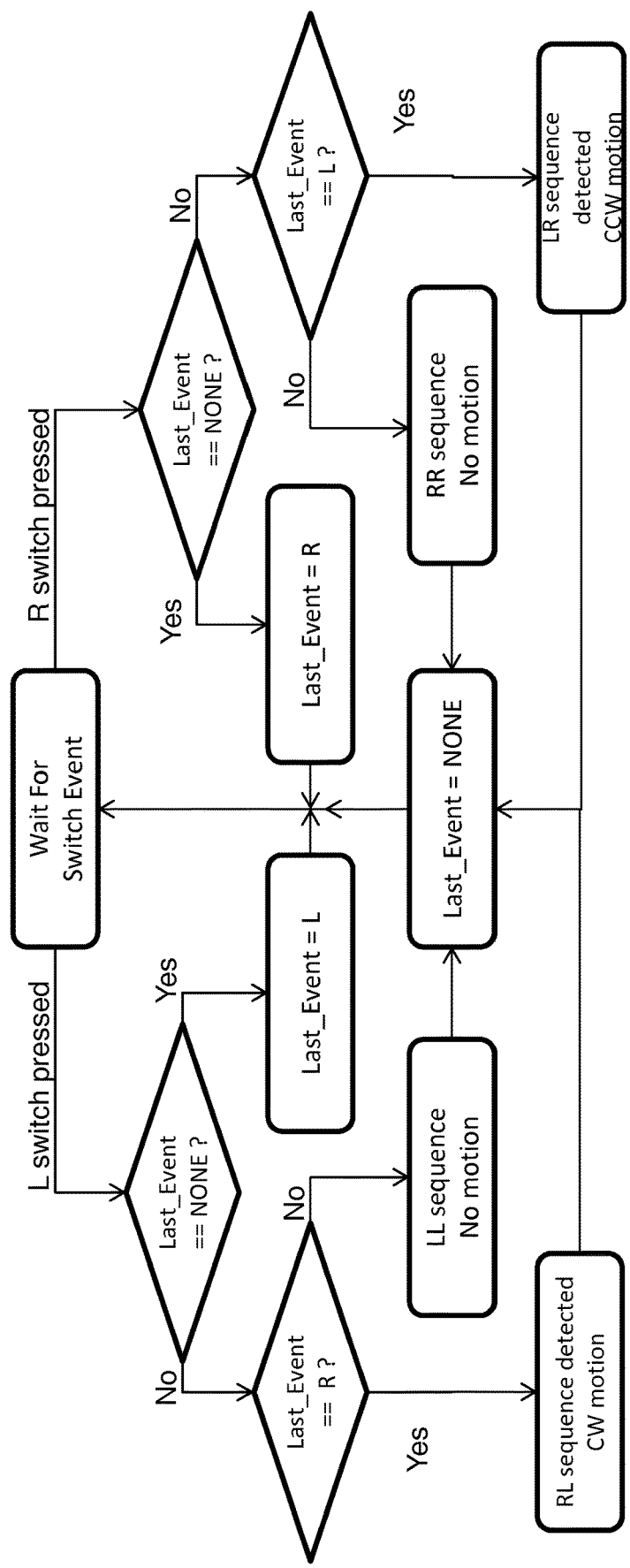

An exemplary algorithm is shown below to illustrate detailed algorithm logic of detecting an event of two switches being sequentially activated, such as, pressed/pushed/asserted as shown in FIG. 11b.

```
Callback interrupt button_R_CW_routine ( ) {
    If (first_button == NONE) {
        // Right/Clockwise button activation first
        first_button = R_CW; // wait for L button activation
    } else {
        // an event already occured
        If (first_button == L_CCW) {
            // L then R sequence detected
            postEvent (L_CCW_event);
            first_button = NONE; // sequence completed
        } else {
            // R then R sequence : return to idle !
            first_button = NONE;
        }
    }
}
Callback interrupt button_L_CCW_routine ( ) {
    If (first_button == NONE) {
        // Left/CounterClockwise button activation first
        first_button = L_CCW; // wait for R button activation
    } else {
        // an event already occured
        If (first_button == R_CW) {
            // R then L sequence detected
            postEvent (R_CW_event);
            first_button = NONE; // sequence completed
        } else {
            // L then L sequence : return to idle !
            first_button = NONE;
        }
    }
}
```

Figure 11C:
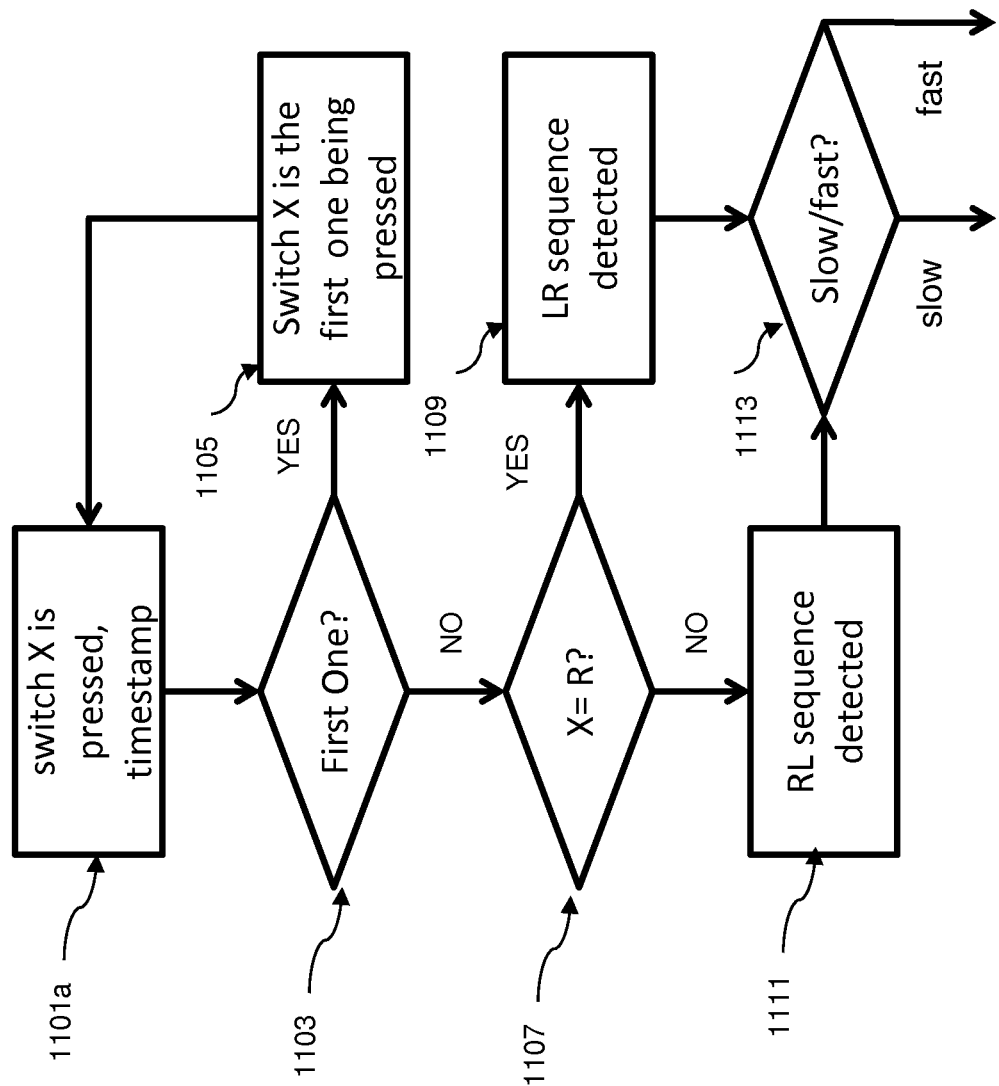

FIG. 11c illustrates an algorithm logic about how to determine an event of two switches (e.g. CCW/L switch 103, CW/R switch 101) being sequentially activates, such as, pressed/pushed/asserted and a speed of bezel rotation. Two switches being sequentially pressed is also illustrated in FIGS. 5a-5e, and FIGS. 10a-10b. Estimating a speed of bezel rotation is also illustrated in FIG. 6.

In FIG. 11c, a switch X (i.e. the current switch, can be CCW/L switch 103 or CW/R switch 101) being pressed is detected (see block 1101a). The moment of detecting is recorded (e.g. timestamp when switch X is pressed). If switch X is the first switch being pressed, then the first switch being pressed is recorded (see block 1105). Otherwise, if switch X is the right switch (e.g. CW/R switch 101), which can mean a right switch is the second switch being pressed, then a LR sequence (e.g. counterclockwise rotation) may be detected, (see block 1109). If switch X is not the right switch (e.g. X is CCW/L switch 103), which can mean a left switch is the second switch being pressed, then a RL sequence (e.g. clockwise rotation) may be detected (see block 1111). As aforementioned, the elapsed time between events of switches being pressed can be used to estimate a speed of bezel rotation. For example, if elapsed time fulfills the standard of a slow rotation event, then a slow rotation event is recorded. If elapsed time fulfills the standard of a fast rotation event, then a fast rotation event is recorded (see block 1113).

Figure 11D:
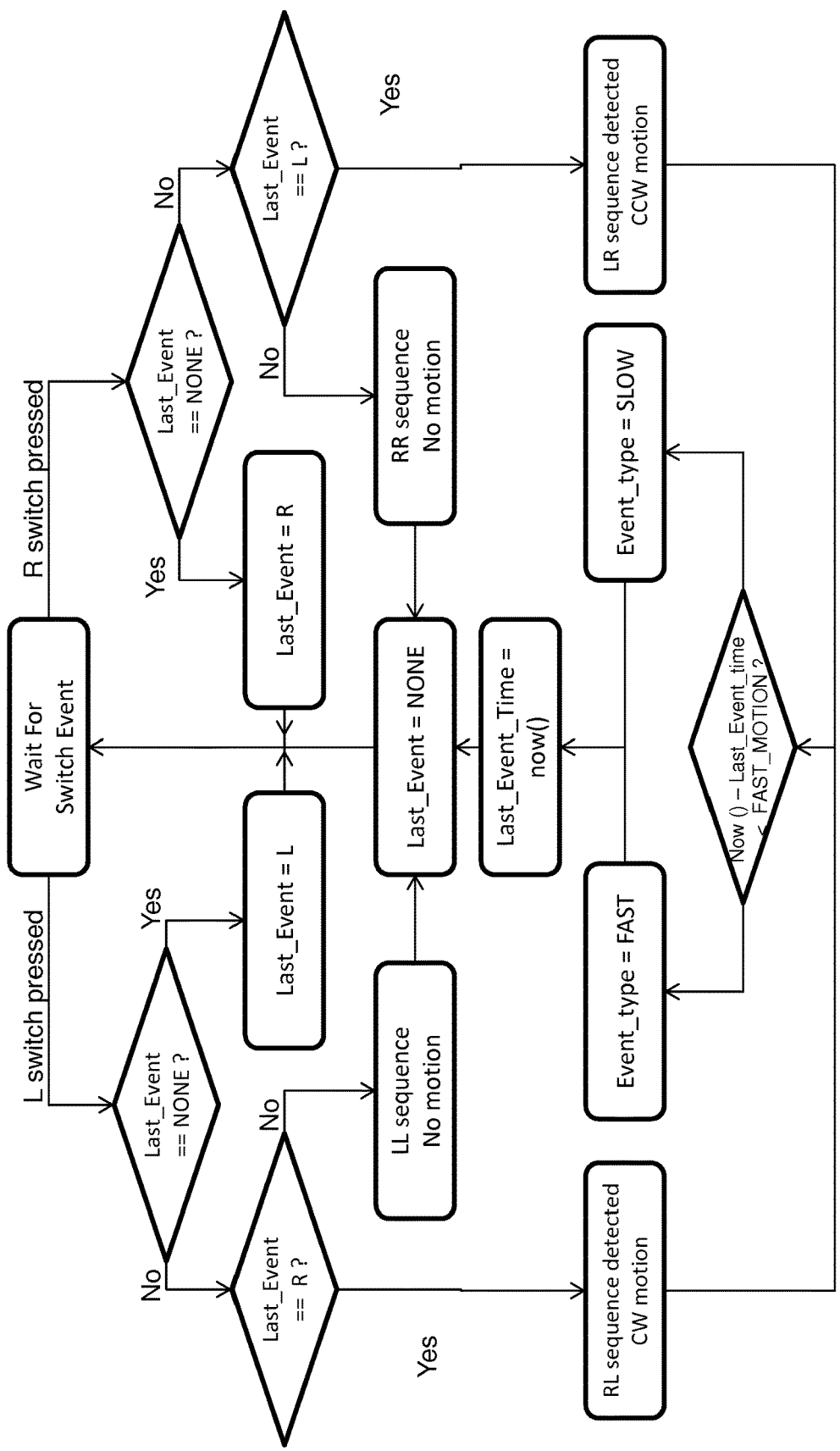

An exemplary algorithm is shown below to illustrate detailed algorithm logic of detecting an event of two switches being sequentially activated, such as, pressed/pushed/asserted and detecting a speed of bezel rotation as shown in FIG. 11d.

```
Callback interrupt button_R_CW_routine ( ) {
    If (first_button == NONE) {
        // Right/Clockwise button activation first
        first_button = R_CW; // wait for L button activation
        // timestamp start of the step event
        step_event_time = now( );
    } else {
        // an event already occured
        If (first_button == L_CCW) {
            // L then R sequence detected
            If (now( )- last_event_time > SLOW_MOTION) event_type = SLOW
            else event_type = FAST;
            Last_event_time = step_event_time;
            postEvent (L_CCW_event, event_type);
            first_button = NONE; // sequence completed
        } else {
            // R then R sequence : return to idle !
            first_button = NONE;
        }
    }
}
Callback interrupt button_L_CCW_routine ( ) {
    If (first_button == NONE) {
        // Left/CounterClockwise button activation first
        first_button = L_CCW; // wait for R button activation
        // timestamp start of the step event
        step_event_time = now( );
    } else {
        // an event already occured
        If (first_button == R_CW) {
            // R then L sequence detected
            // end of step event : mesure elapsed time with the previous
            If (now ( ) - last_event_time > SLOW_MOTION) event_type = SLOW
            else event_type = FAST;
            Last_event_time = step_event_time;
            postEvent (R_CW_event_type);
            first_button = NONE; // sequence completed
        } else {
            // L then L sequence ; return to idle !
            first_button = NONE;
        }
    }
}
```

Figure 11E:
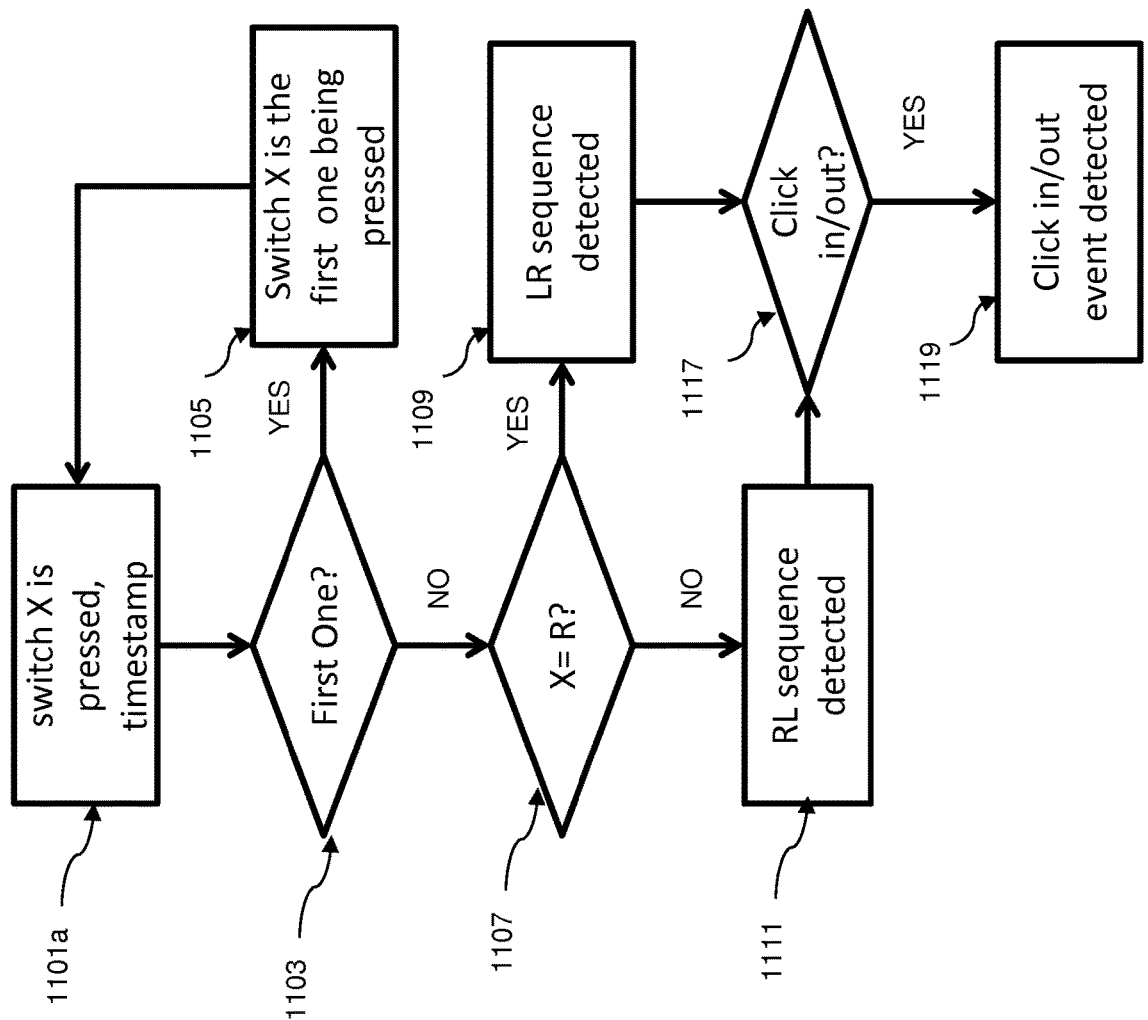

FIG. 11e illustrate an algorithm logic about how to determine an event of two switches (e.g. CCW/L switch 103, CW/R switch 101) being sequentially activated, such as, pressed/pushed/asserted, a speed of bezel rotation, and an event of bezel being click in/out. Two switches being sequentially pressed is also illustrated in FIGS. 5a-5e, and FIGS. 10a-10b. Estimating a speed of bezel rotation is also illustrated in FIG. 6. The click feature of a rotating bezel is also shown in FIGS. 7a-7d, and FIGS. 9a-9i.

In FIG. 11e, a switch X (i.e. the current switch, can be CCW/L switch 103 or CW/R switch 101) being pressed is detected (see block 1101a). The moment of detecting is recorded (e.g. timestamp when switch X is pressed). If switch X is the first switch being pressed, then the first switch being pressed is recorded (see block 1105). Otherwise, the algorithm logic continues to check event of rotation and/or speed of rotation. If switch X is the right switch (e.g. CW/R switch 101), which can mean a right switch is the second switch being pressed, then a LR sequence (e.g. counterclockwise rotation) may be detected, (see block 1109). If switch X is not the right switch (e.g. Xis CCW/L switch 103), which can mean a left switch is the second switch being pressed, then a RL sequence (e.g. clockwise rotation) may be detected (see block 1111). The elapsed time between events of switches being pressed can be used to estimate whether it is a bezel click event or a bezel rotation event. If elapsed time is short enough (e.g. two switches are almost pressed down simultaneously) to justify an event of bezel being click down, an event of bezel click in/out is recorded (see block 1119). Otherwise, an event of bezel rotation may be determined. Moreover, as aforementioned, the elapsed time between events of switch being pressed can be used to estimate a speed of bezel rotation. For example, if elapsed time fulfills the standard of a slow rotation event, then a slow rotation event is recorded. If elapsed time fulfills the standard of a fast rotation event, then a fast rotation event is recorded.

Figure 11F:
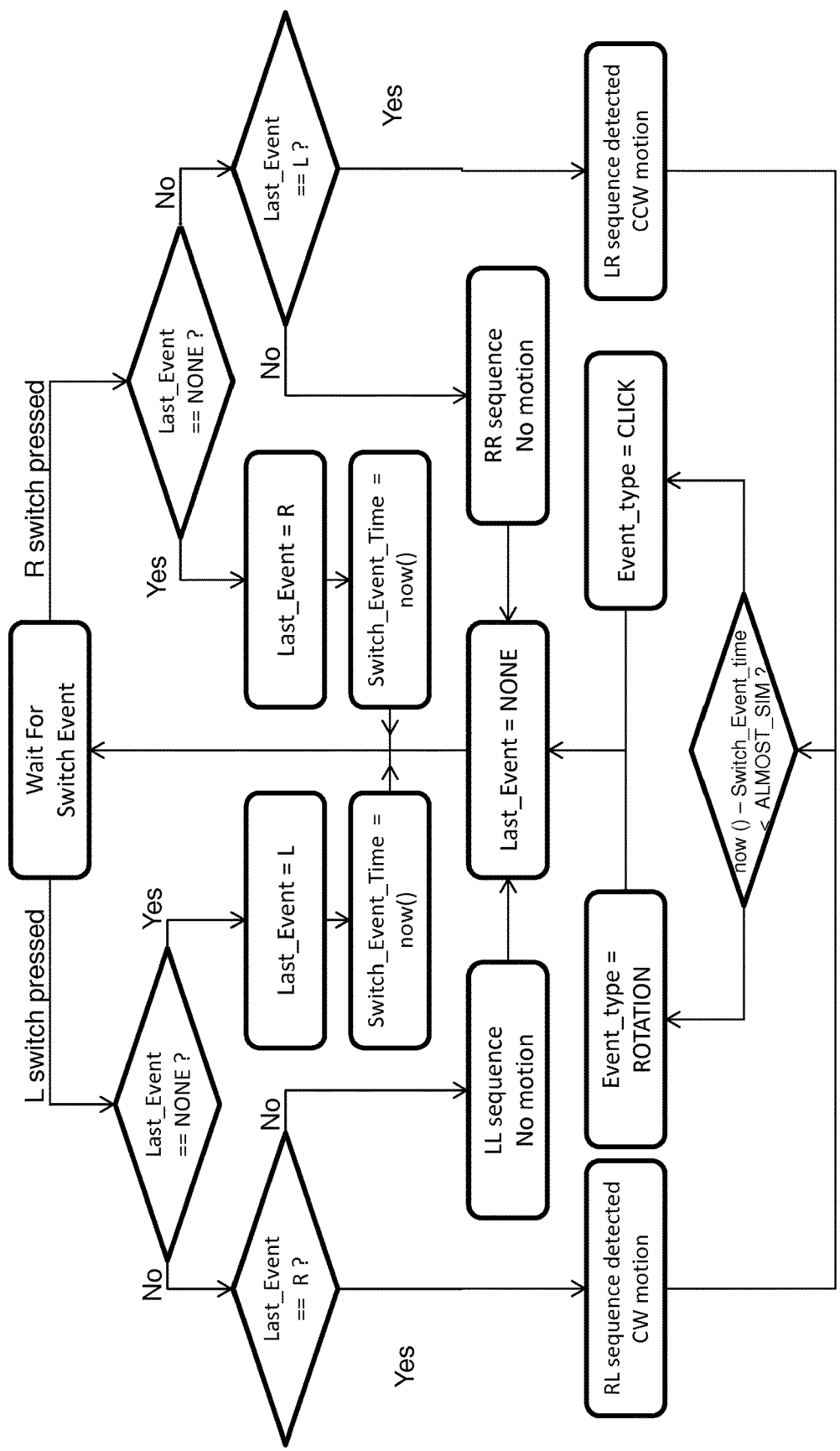

An exemplary algorithm is shown below to illustrate detailed algorithm logic of detecting an event of two switches being sequentially activated, such as, pressed/pushed/asserted, and detecting a bezel click as shown in FIG. 11*f*.

```
Callback interrupt button_R_CW_routine ( ) {
If (first_button == NONE) {
// Right/Clockwise button activation first
first_button = R_CW; // wait for L button activation
// timestamp start of the step event
button_event_time = now( );
} else {
    // an event already occured
    If (first_button == L_CW) {
        If (now( ) - button_event_time < ALMOST_SIM) {
            // Click event
            Post_event (CLICK_IN_event);
first_button = NONE;
        } else {
            // L then R sequence detected
postEvent (L_CCW_event);
first_button = NONE; // sequence completed
        }
    } else {
        // half step and return detected (R then R) ; return to idle !
            first_button = NONE;
    }
}
Callback interrupt button_L_CCW_routine ( ) {
If (first_button == NONE) {
// Right/Clockwise button activation first
first_button = L_CCW; // wait for L button activation
// timestamp start of the step event
button_event_time = now( );
} else {
    // an event already occured
    If (first_button == R_CW) {
        If (now( ) - button_event_time < ALMOST_SIM) {
            // Click event
            Post_event (CLICK_IN_event);
first_button = NONE;
        } else {
            // R then L sequence detected
postEvent (L_CCW_event);
first_button = NONE; // sequence completed
        }
    } else {
```

-continued

```
        // half step and return detected (R then R) ; return to idle !
            first_button = NONE;
    }
}
```

Embodiments of the invention provide new means of interaction with an electronic device. As the interaction can be differentiated between a "classical" direct touch of the touch panel and one including the bezel, the user interface can be tweaked and optimized when the bezel is used. Using the bezel of an electronic device has the advantage that the view of the display is not obstructed by the user's fingers. As an example, this allows to play games while controlling the electronic device with the rotatable bezel. The rotatable bezel provides advantageous technical effects for the navigation of and interaction with the electronic device, while leveraging the benefits of a simple analog user interface.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An electronic device, comprising:
 a processor configured to implement a user interface to allow a user to interact with the electronic device;

a display coupled to the processor and configured to allow the user to interact with the electronic device using the user interface;
at least two switches;
a housing; and
a bezel rotatably mounted on the housing and configured to rotate to allow the user to interact with the electronic device using the user interface, wherein the bezel comprises a plurality of teeth configured to sequentially activate the at least two switches during rotation of the bezel, and wherein at least one tooth position is empty.

2. The electronic device of claim 1, further comprising a microprocessor coupled to the at least two switches and configured to detect that the at least two switches are sequentially activated.

3. The electronic device of claim 2, further comprising at least one bidirectional spring coupled to the bezel.

4. The electronic device of claim 3, further comprising at least one second spring coupled to the bezel and configured to allow the user to push the bezel down.

5. The electronic device of claim 3, further comprising a dedicated switch coupled to the bezel and configured to detect an event of the bezel being pushed down.

6. The electronic device of claim 2, further comprising at least one second spring coupled to the bezel and configured to allow the user to push the bezel down.

7. The electronic device of claim 2, wherein the at least two switches comprise a first switch and a second switch, and wherein a first distance between the first switch and a first tooth of the teeth that is nearest to the first switch is smaller than a second distance between the second switch and a second tooth of the teeth that is nearest to the second switch when the bezel is in an idle position.

8. The electronic device of claim 1, further comprising at least one bidirectional spring coupled to the bezel.

9. The electronic device of claim 8, further comprising at least one second spring coupled to the bezel and configured to allow the user to push the bezel down.

10. The electronic device of claim 1, further comprising at least one second spring coupled to the bezel and configured to allow the user to push the bezel down.

11. The electronic device of claim 1, wherein each of the at least two switches comprises a movable upper part and a lower part.

12. The electronic device of claim 11, further comprising a seal, wherein the movable upper part is configured to penetrate a hole in a frame of the electronic device to contact the teeth, and wherein the seal is disposed in the hole.

13. The electronic device of claim 1, wherein each of the at least two switches comprises a single pole single throw (SPST) switch.

14. The electronic device of claim 1, wherein the teeth are equally distanced.

15. The electronic device of claim 1, wherein the at least two switches comprise a first switch and a second switch, and wherein a first distance between the first switch and a first tooth of the teeth that is nearest to the first switch is smaller than a second distance between the second switch and a second tooth of the teeth that is nearest to the second switch when the bezel is in an idle position.

16. The electronic device of claim 1, wherein the at least two switches comprise at least two sets of cooperating switches.

17. An electronic device, comprising:
a processor configured to implement a user interface to allow a user to interact with the electronic device;
a display coupled to the processor and configured to allow the user to interact with the electronic device using the user interface;
at least two switches;
a housing; and
a bezel rotatably mounted on the housing and configured to rotate to allow the user to interact with the electronic device using the user interface, wherein the bezel comprises a plurality of locations that are equally spaced, wherein the bezel comprises teeth that are located at a subset of the locations and that are configured to sequentially activate the at least two switches during rotation of the bezel, and wherein at least one of the locations does not include a tooth.

* * * * *